(12) United States Patent
Yuzuta et al.

(10) Patent No.: US 12,375,617 B2
(45) Date of Patent: Jul. 29, 2025

(54) NON-TRANSITORY COMPUTER READABLE STORAGE MEDIUM, IMAGE PROCESSING APPARATUS, AND CONTROL METHOD OF IMAGE PROCESSING APPARATUS FOR SETTINGS FOR PERFORMING PRINTING USING SPOT COLORS

(71) Applicant: CANON KABUSHIKI KAISHA, Tokyo (JP)

(72) Inventors: Misae Yuzuta, Kanagawa (JP); Mitsuru Uratani, Kanagawa (JP); Kouta Murasawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 18/479,542

(22) Filed: Oct. 2, 2023

(65) Prior Publication Data
US 2024/0109357 A1    Apr. 4, 2024

(30) Foreign Application Priority Data
Oct. 4, 2022    (JP) .................................. 2022-160592

(51) Int. Cl.
*H04N 1/60*    (2006.01)
*H04N 1/00*    (2006.01)
*H04N 1/54*    (2006.01)

(52) U.S. Cl.
CPC .............. *H04N 1/6075* (2013.01); *H04N 1/54* (2013.01); *H04N 1/6025* (2013.01); *H04N 1/0044* (2013.01)

(58) Field of Classification Search
CPC ...... H04N 1/6075; H04N 1/54; H04N 1/6025; H04N 1/0044
See application file for complete search history.

(56) References Cited

U.S. PATENT DOCUMENTS

| | | | |
|---|---|---|---|
| 7,177,465 B1 * | 2/2007 | Takahira | H04N 1/6058 358/1.9 |
| 2004/0071340 A1 * | 4/2004 | Kondo | H04N 1/6058 382/162 |
| 2005/0163374 A1 * | 7/2005 | Ferman | H04N 1/40062 382/176 |
| 2007/0097389 A1 * | 5/2007 | Morovic | H04N 1/6058 358/1.9 |
| 2009/0122372 A1 * | 5/2009 | Miyahara | H04N 1/603 358/520 |
| 2012/0120424 A1 * | 5/2012 | Hirano | H04N 1/62 358/1.9 |

(Continued)

FOREIGN PATENT DOCUMENTS

JP    2021008112 A    1/2021

*Primary Examiner* — Nicholas Pachol
(74) *Attorney, Agent, or Firm* — Canon U.S.A., Inc. IP Division

(57) ABSTRACT

An image processing apparatus caused to perform controlling for making a first lightness compression ratio of a first image region higher than a second lightness compression ratio of a second image region based on a setting for printing an image using a spot color that is different from process colors being set, the first image region not corresponding to the spot color in the image, and the second image region corresponding to the spot color in the image, and controlling for displaying the image after the first controlling is executed.

19 Claims, 17 Drawing Sheets

(56) References Cited

U.S. PATENT DOCUMENTS

| | | | | |
|---|---|---|---|---|
| 2014/0037307 A1* | 2/2014 | Kuo | ................. | H04N 1/6066 |
| | | | | 358/1.9 |
| 2016/0037019 A1* | 2/2016 | Xue | ................. | H04N 1/46 |
| | | | | 345/590 |
| 2019/0335149 A1* | 10/2019 | Hirota | ................. | H04N 5/66 |
| 2020/0106928 A1* | 4/2020 | Thebault | ............. | H04N 1/6066 |
| 2023/0286288 A1* | 9/2023 | Mochizuki | ............. | B41J 2/2107 |

* cited by examiner

FIG. 13B

| COLOR INPUT ( R, G, B ) | OUTPUT ( R, G, B ) |
|---|---|
| ( 0,0,0 ) | ( 0,0,0 ) |
| ( 0,0,64 ) | ( 0,,0,68 ) |
| ( 0,0,128 ) | ( 0,0,132 ) |
| ⋮ | ⋮ |
| ( 255,0,255 ) | ( 255, 0, 255 ) |
| ( 255,51,0 ) | ( 255,56,,1 ) |
| ⋮ | ⋮ |
| ( 255,0,0 ) | ( 255,0,0 ) |
| ⋮ | ⋮ |
| ( 255,255,0 ) | ( 255,255,0 ) |
| ⋮ | ⋮ |
| ( 255,255,192 ) | ( 255,255,195 ) |
| ( 255,255,255 ) | ( 255,255,255 ) |

NON-TRANSITORY COMPUTER READABLE STORAGE MEDIUM, IMAGE PROCESSING APPARATUS, AND CONTROL METHOD OF IMAGE PROCESSING APPARATUS FOR SETTINGS FOR PERFORMING PRINTING USING SPOT COLORS

BACKGROUND

Field of the Disclosure

The present disclosure relates to a non-transitory computer readable storage medium that is used for previewing an image to be printed by a recording apparatus equipped with a coloring material having a fluorescent characteristic and a coloring material having a non-fluorescent characteristic, an image processing apparatus, and a control method of the image processing apparatus.

Description of the Related Art

Conventionally, a print preview function has been known as a function for checking a print result before actual printing by a printing apparatus. By the print preview function, it is possible to prevent unintended printing by checking the print result before the printing, and to reduce printing costs.

On the other hand, in recent years, since an ink (hereinafter referred to as a "fluorescent color ink") using a coloring material exhibiting fluorescence is brightly and vividly colored, the fluorescent color ink has been used in the recording apparatus for the purpose of drawing viewer's attention to printing such as poster and POP notices, wrapping of food and beverage products, and the like. Therefore, a preview function for grasping a place where a special ink such as the fluorescent color ink is to be used on an image has been known (see Japanese Patent Application Laid-Open No. 2021-8112).

As programs corresponding to settings for performing printing using spot colors (special colors) become widespread, it is desired to improve convenience of such programs.

SUMMARY

It is an object of the present disclosure to improve convenience of a program corresponding to a setting for performing printing using a spot color.

A non-transitory computer readable storage medium in the present disclosure stores a program to execute first controlling for making a first lightness compression ratio of a first image region higher than a second lightness compression ratio of a second image region based on a setting for printing an image using a spot color that is different from process colors being set, the first image region not corresponding to the spot color in the image, and the second image region corresponding to the spot color in the image, and second controlling for displaying the image after the first controlling is executed.

According to the image processing apparatus of the present disclosure, a user can grasp an impression caused by color development of a fluorescent color ink before printing.

Further features of the present disclosure will become apparent from the following description of embodiments with reference to the attached drawings.

BRIEF DESCRIPTION OF THE DRAWINGS

FIG. 13B is a correspondence table of RGB values and monitor RGB values.

DESCRIPTION OF THE EMBODIMENTS

Embodiments of the present disclosure will be described in detail below with reference to the drawings.

It should be noted that the following embodiments do not limit the disclosure claimed, and not all combinations of features described in the embodiments are essential to the means of solving the object of the disclosure.

First Embodiment

<Configuration of Image Processing Apparatus>

Figure 1:
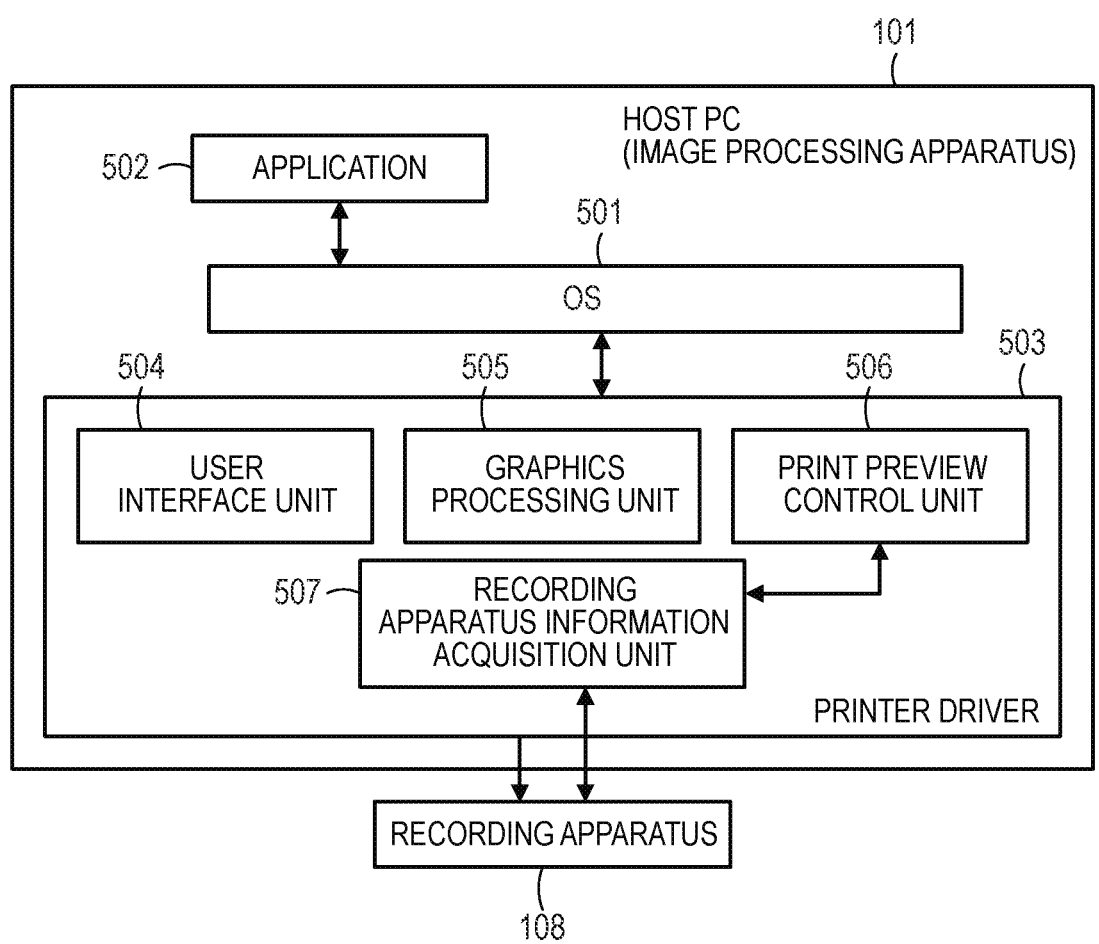
FIG. 1 is a software block diagram of an image processing apparatus.

FIG. 1 is a software block diagram of an image processing apparatus 101 according to the present disclosure. A printing system of the present embodiment includes the image processing apparatus 101 and a recording apparatus 108 connected to the image processing apparatus 101.

An operation system (hereinafter referred to as an "OS") 501 and a driver (hereinafter referred to as a printer driver) 503, which is software for controlling the recording apparatus 108, are installed in the image processing apparatus 101. In the image processing apparatus 101, the OS 501 and the printer driver 503 operate to print various documents created by an application 502. The printer driver 503 includes the following four functional units. That is, there are a user interface unit 504 that receives an input from a user, a graphics processing unit 505 that generates print data to be transmitted to the recording apparatus 108, and a print preview control unit 506 that controls a print preview function for confirming a print layout and the like. Further, in addition to the above, there is a recording apparatus information acquisition unit 507 that acquires various kinds of recording apparatus information such as width information of a print medium loaded in the recording apparatus 108, a current state of the recording apparatus 108 and the like, and transmits information to the recording apparatus 108.

In the present embodiment, the recording apparatus 108 connected to the image processing apparatus 101 is a printer that forms (prints) an image on a recording medium by applying a recording agent such as ink to the recording medium such as paper. The recording apparatus 108 may be a multifunction peripheral having a plurality of functions such as a copying function, a facsimile function, a printing function and the like. Incidentally, in the present embodiment, the recording apparatus 108 is assumed to be an apparatus that performs printing by an ink-jet recording method, but it is not limited to this. For example, it may be an apparatus that performs printing by an electrophotographic method or a thermal sublimation method.

Further, in the present embodiment, the recording apparatus 108 may be a printing apparatus capable of performing printing using a spot color ink. The spot color ink is an ink that represents a spot color, which is, for example, an ink that represents a color that is needed for printing but cannot be represented using an sRGB color space. That is, the printer is configured to be able to perform spot color printing, which is the printing using ink (i.e., the spot color ink, and hereinafter referred to as the "spot color ink") of a spot color other than normal inks. Here, the "normal inks" are inks for performing the printing of process colors (normal colors), and are inks of colors such as cyan (C), magenta (M), yellow (Y) and black (K), which are the basic colors of the process color. The process color is a color that is represented by one color of CMYK or a combination of two or more colors of CMYK.

In the present embodiment, a fluorescent pink ink and a fluorescent orange ink are used as the spot color inks. That is, the spot color is a color that is different from the process color and cannot be represented only by one color out of CMYK or a combination of two or more colors out of CMYK. However, the present disclosure is not limited to the present embodiment, and the number and color of the spot color inks may be arbitrary, and inks of colors other than fluorescent colors may be used. For example, a violet ink, a green ink, an orange ink, a gold ink, a silver ink, or the like may be used as the spot color ink. Besides, inks of other metallic colors may also be used. Further, an ink obtained by mixing the spot color ink and another ink (e.g., a normal ink) may also be treated as the spot color ink.

In the present embodiment, as for an object to be printed with the spot color in image data, information (referred to as spot color information) indicating that the relevant object is printed with the spot color is associated with the object. A pixel to which the spot color information is added is printed by the spot color corresponding to an RGB value of the pixel. The RGB value of the pixel corresponding to the spot color can also be used as the RGB value of the pixel corresponding to the color (i.e., the normal color) represented only by the normal ink. In other words, the same RGB value as the RGB value of the pixel corresponding to the spot color may be set for the pixel corresponding to the color represented only by the normal ink. In this case, whether or not to use the spot color ink for printing the pixels of the RGB values is controlled by whether or not instruction information for instructing the printing using the spot color is added to print data. Further, the instruction information is added to the print data generated in a state where a mode for executing the printing using the spot color is set in the later-described printer driver 503.

If a later-described fluorescent poster mode is designated in the printer driver 503, the instruction information is information for instructing the printing with the spot color for all the RGB values of the pixels corresponding to the spot color. On the other hand, if a fluorescent spot color mode is designated in the printer driver 503, the instruction information is information for instructing the printing using the spot color validly set in the printer driver 503 among the spot colors usable by the recording apparatus 108. Further, no instruction information is added to the image data generated in a state in which a mode for executing the printing using the spot color is not set in the printer driver 503.

<Overall Printing System>

Figure 2:
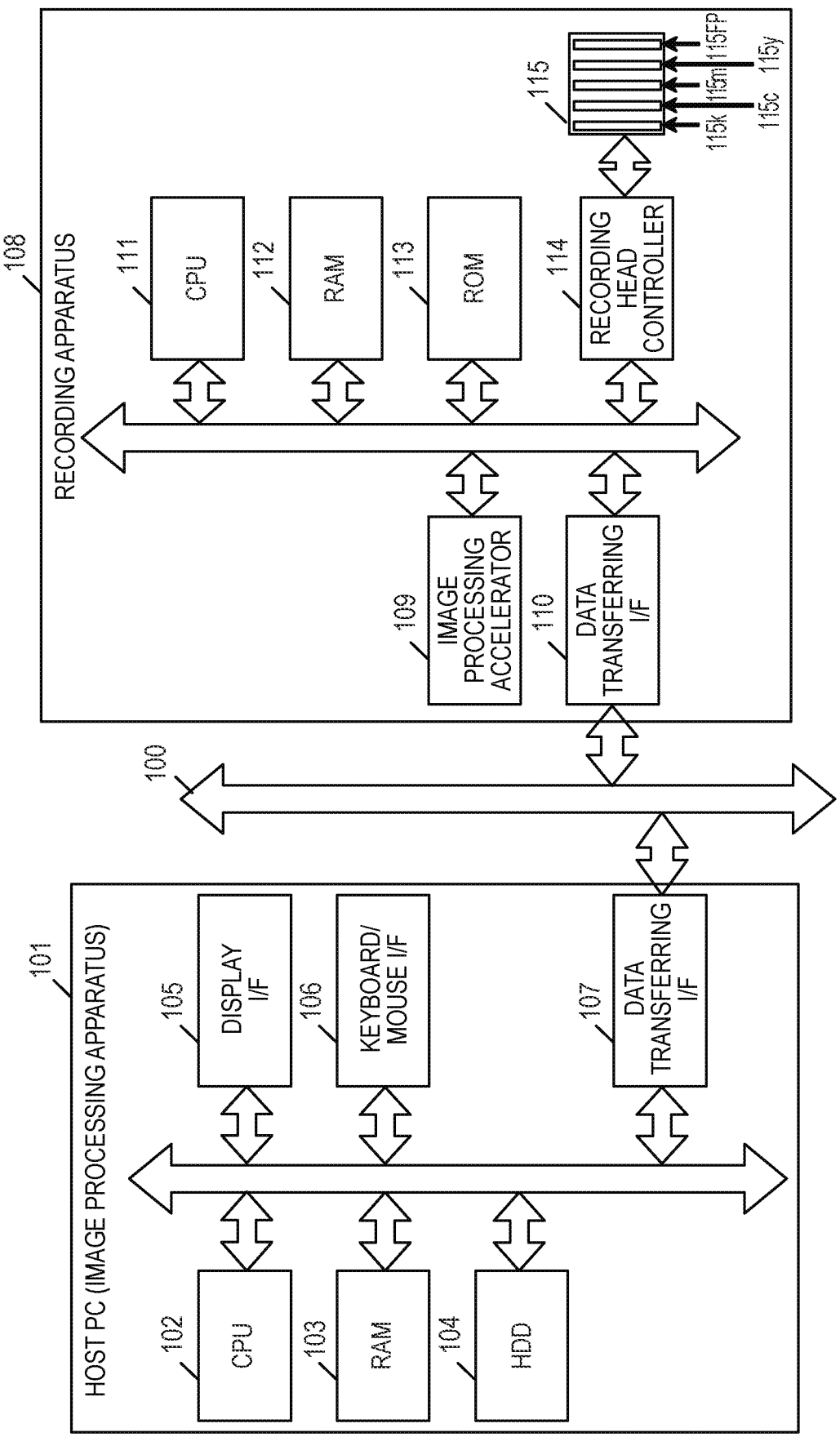
FIG. 2 is a block diagram showing a configuration of a printing system according to the embodiments.

FIG. 2 is a block diagram showing a configuration of the printing system according to the present disclosure. The image processing apparatus 101 may be a host PC, a tablet PC and the like.

A CPU 102 executes various processes while using a RAM 103 as a work area in accordance with a program held in an HDD 104. For example, the CPU 102 generates image data which can be recorded by the recording apparatus 108 in accordance with a command received from a user via a keyboard/mouse I/F 106 or a touch panel (not shown), or a program held in the HDD 104, and transfers the generated image data to the recording apparatus 108. Further, the CPU 102 performs processes on the image data received from the recording apparatus 108 via a data transferring I/F 107 in accordance with a program stored in the HDD 104, and displays a result of the processes and various information on a display as a display apparatus via a display I/F 105.

On the other hand, in the recording apparatus 108, a CPU 111 executes various processes while using a RAM 112 as a work area in accordance with a program held in a ROM 113.

Further, the recording apparatus 108 includes an image processing accelerator 109 for performing a high-speed image process. The image processing accelerator 109 is hardware capable of executing an image process at higher speed than the CPU 111. The image processing accelerator 109 is started by the CPU 111 writing parameters and data necessary for the image process to a predetermined address of the RAM 112, reads the parameters and data, and then executes the predetermined image process on the data. However, the image processing accelerator 109 is not an essential element, and an equivalent process can be executed by the CPU 111. The parameters may be stored in the ROM 113, or may be stored in a storage (not shown) such as a flash memory, an HDD or the like.

(Image Process)

Here, the predetermined image process performed by the CPU 111 or the image processing accelerator 109 will be described. The predetermined image process is a process for processing the input print data into data indicating a dot formation position of the ink in each scan.

The CPU 111 or the image processing accelerator 109 performs color conversion and quantization of the input print data. The color conversion is a process of performing color conversion into an ink density to be handled by the recording apparatus. For example, the input print data includes image data representing an image and fluorescent data for performing fluorescent printing. If the image data represents the image in color space coordinates such as sRGB, which is representation colors of a monitor, the color coordinates (R, G, B) of the sRGB are converted into subtractive color mixture ink data (CMYK) of the recording apparatus or ink data (CMYKF) including a fluorescent color ink. In the case of the fluorescent data, the data is converted into fluorescent color ink data. Further, if both the color coordinates (R, G, B) and the fluorescence data exist, they are converted into both the subtractive color mixture ink data (CMYK) and the fluorescent color ink data, or both the ink data (CMYKF) including the fluorescent color ink and the fluorescent color ink data. In the latter case, two planes of the fluorescent color ink data are generated. The conversion is realized by a known method such as a matrix calculation process, a process using a three-dimensional LUT, a process using a four-dimensional LUT, or the like.

Since the recording apparatus 108 of the present embodiment uses the inks of black (K), cyan (C), magenta (M), yellow (Y), and fluorescence (F), the image data of the RGB signals and the fluorescent data are converted into image data of 8-bit color signals of K, C, M, Y, and F. The color signals of the respective colors correspond to the amounts of ink to be applied. Although the five colors of K, C, M, Y, and F are exemplified as the number of inks, in the case of using other inks such as light cyan (Lc), light magenta (Lm), and gray (Gy) inks having a low density for improving image quality, ink signals corresponding to these inks are generated. In the present embodiment, the inks such as the light cyan (Lc), light magenta (Lm), and gray (Gy) inks are also described as the subtractive color mixture inks. Further, achromatic inks such as black (K) and gray (Gy) inks are also described as the subtractive color mixture inks.

After the conversion, a quantization process is performed on the ink data. This quantization process is a process for lowering the level number of gradations of the ink data. In the present embodiment, the quantization is performed using a dither matrix in which threshold values for comparison with ink data values are arranged for each pixel. Through this quantization process, binary data indicating whether or not to form a dot at each dot formation position can finally be obtained.

(Image Formation on Paper Surface)

After the predetermined image process, a recording head controller 114 transfers recording data to a recording head 115. At the same time, the CPU 111 operates a carriage motor for operating the recording head 115, and further operates a conveying motor for conveying papers. The recording head scans the paper, and at the same time, the predetermined ink is ejected onto the paper surface by the recording head 115, thereby forming the image.

In case of performing multiple scan printing, a scan order determination process is performed after the predetermined image process is performed. In the scan order determination process, in order to generate data corresponding to each scan, an image thinning process is performed for the data after the quantization process by using a mask pattern or the like. A processing speed can further be increased by using the image processing accelerator 109.

The image processing apparatus 101 is connected to the recording apparatus 108 via the data transferring I/F 107, a communication line 100 and a data transferring I/F 110. Here, as one embodiment, the communication line 100 is described as the Ethernet™, but the connection may be established by a USB hub, a wireless communication network using a wireless access point, or a Wifi direct communication function.

Hereinafter, a description will be given of an example in which the recording head has a total of five recording nozzle rows, i.e., four color inks of cyan (C), magenta (M), yellow (Y) and black (K), and fluorescent pink (FP) inks. The fluorescent color ink may be a fluorescent red (FR) ink, a fluorescent yellow (FY) ink, a fluorescent green (FG) ink or a fluorescent blue (FB) ink, in addition to the fluorescent pink ink. Further, a plurality of fluorescent color inks may be mounted. In the present disclosure, it is preferable that a plurality of inks respectively having hue angles of color development close to that of the subtractive color mixture ink of the chromatic color are mounted. For example, it is preferable to use the fluorescent pink ink having the hue angle close to that of the magenta ink, the fluorescent yellow ink having the hue angle close to that of the yellow ink, and the fluorescent blue ink having the hue angle close to that of the cyan ink. In the present disclosure, one fluorescent color ink may be used.

<Recording Head of Recording Apparatus>

Figure 3:
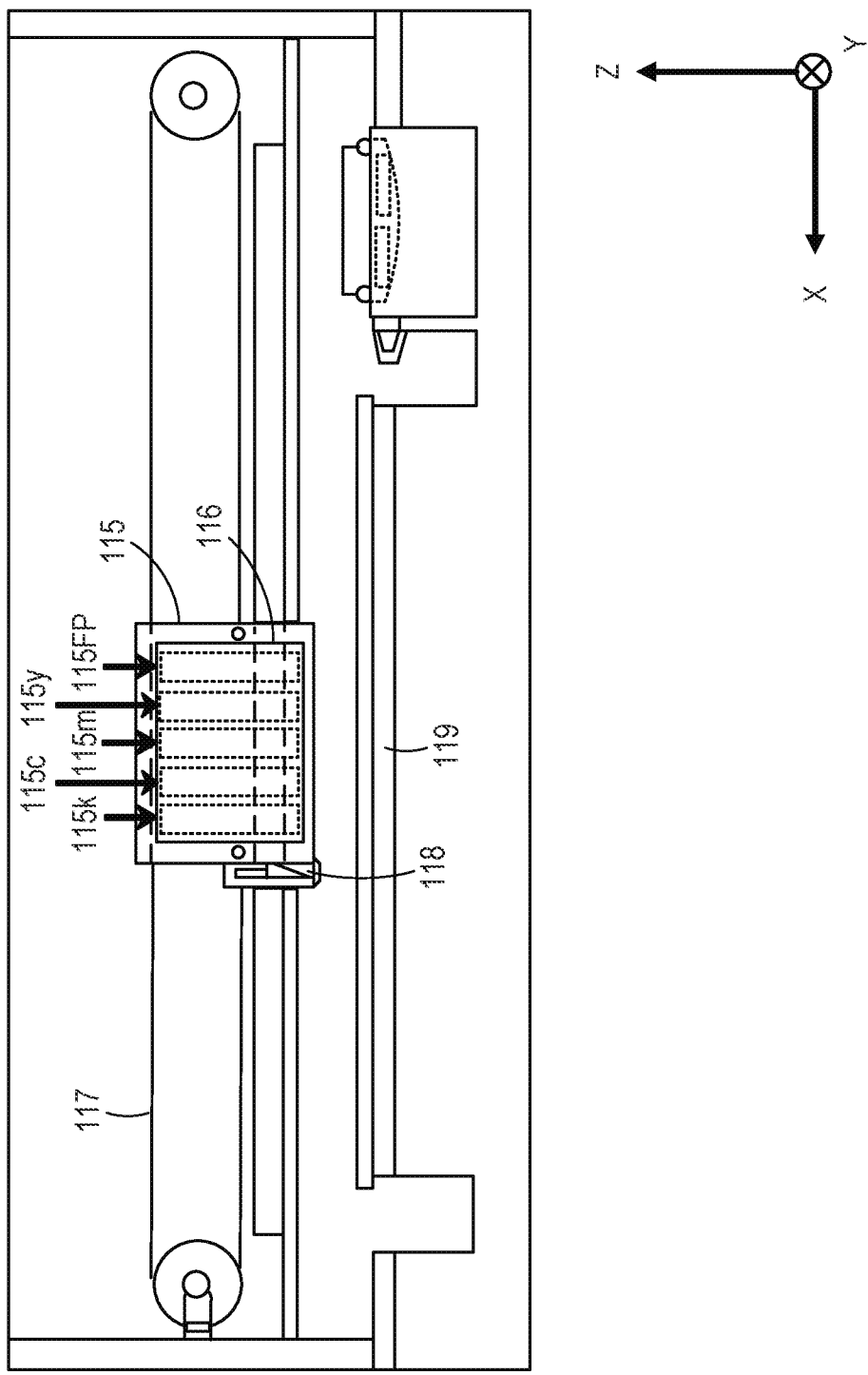
FIG. 3 is a diagram showing a recording head according to the embodiments.

FIG. 3 is a diagram showing the recording head 115 according to the present embodiment. The recording head 115 includes a carriage 116, nozzle rows 115k, 115c, 115m, 115y and 115FP, and an optical sensor 118. The carriage 116 on which the five nozzle rows 115k, 115c, 115m, 115y and 115FP and the optical sensor 118 are mounted can reciprocate along the X direction (so-called a main scanning direction) in the figure by driving force of a carriage motor transmitted via a belt 117. During the movement of the carriage 116 in the X direction relatively to the recording medium, the ink is ejected from each nozzle of the nozzle row in the gravity direction (the −Z direction in the figure) based on the recording data. Thereby, an image for one main scan is recorded on the recording medium disposed on a platen 119. When one main scan is completed, the recording medium is conveyed along the conveying direction (the −Y direction in the figure) by a distance corresponding to the width of one main scan. By alternately repeating the main scanning operation and the conveying operation, the image is gradually formed on the recording medium.

The optical sensor 118 decides whether or not the recording medium exists on the platen 119 by performing a detection operation while moving together with the carriage 116.

<Description of Print Head>

Figure 4:
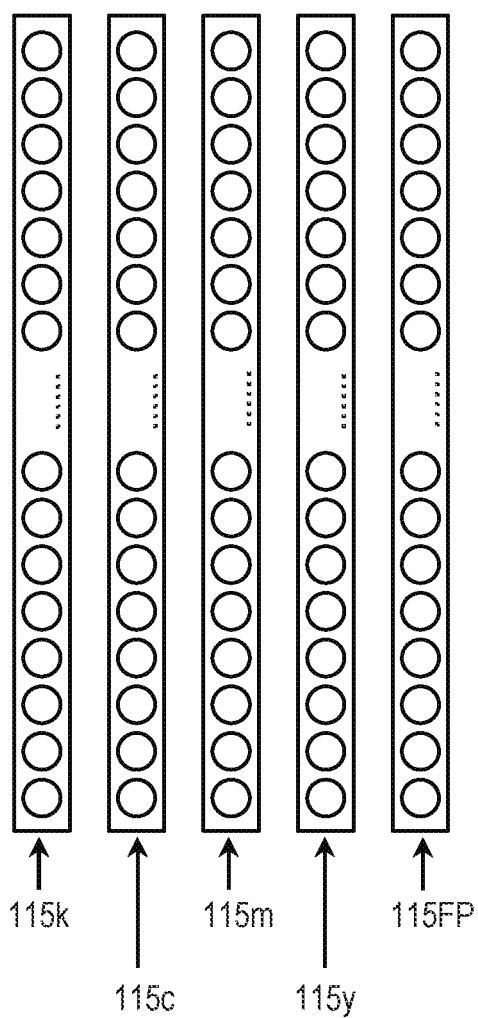
FIG. 4 is a diagram showing an arrangement of nozzle rows of the recording head.
Figure 4:
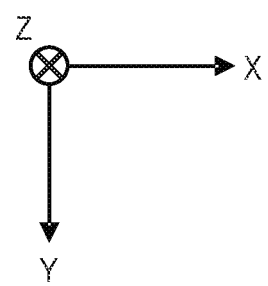
Figure 4:
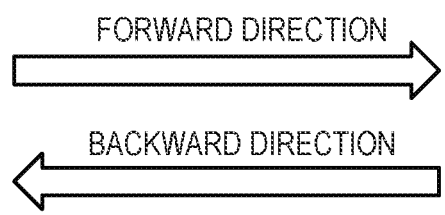

FIG. 4 is a diagram showing the arrangement of the nozzle rows if the recording head 115 is viewed from the top surface (the −Z direction) of the apparatus. The recording head 115 includes the five nozzle rows, i.e., the nozzle row 115k corresponding to the K ink, the nozzle row 115c corresponding to the C ink, the nozzle row 115m corresponding to the M ink, the nozzle row 115y corresponding to the Y ink, and the nozzle row 115FP corresponding to the FP ink. The five nozzle rows are arranged such that their positions in the X direction are different from others. The C ink is ejected from the nozzles of the nozzle row 115c. The M ink is ejected from the nozzles of the nozzle row 115m. The Y ink is ejected from the nozzles of the nozzle row 115y. The K ink is ejected from the nozzles of the nozzle row 115k. The FP ink is ejected from the nozzles of the nozzle row 115FP. In each nozzle row, the plurality of nozzles for ejecting ink as droplets are arranged at a predetermined pitch along the Y direction. Then, the recording head 115 forms the image on the recording medium by ejecting the ink from each nozzle row while moving in the ±X directions.

<Characteristics of Fluorescent Color Inks and Subtractive Color Mixture Inks>

Figure 5:
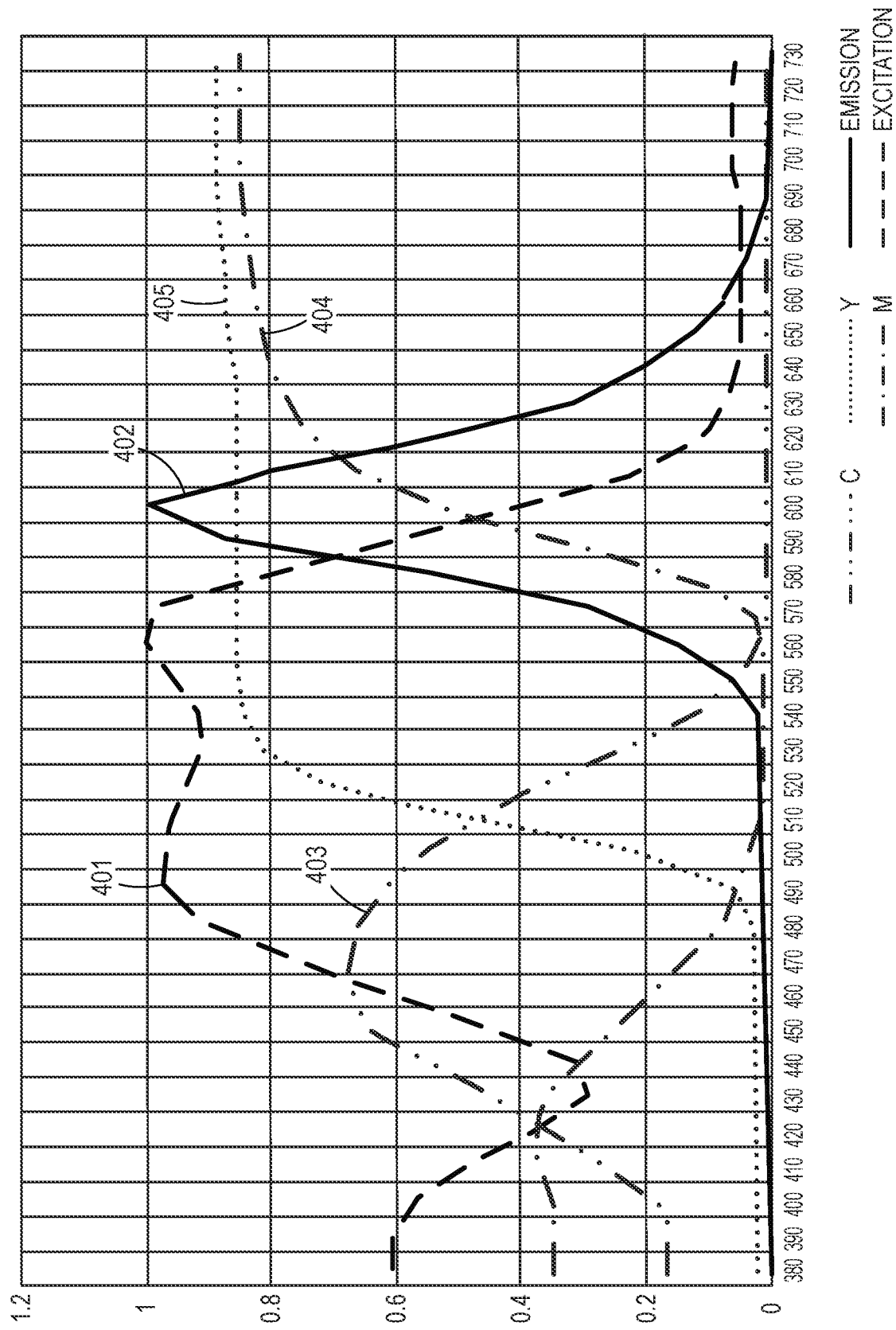
FIG. 5 shows intensity of excitation of a fluorescent pink ink and spectral reflectances of subtractive color mixture inks.

A fluorescent coloring material is a coloring material that absorbs light of an excitation wavelength from a ground state to be in an excited state, emits light of an emission wavelength, and returns to the ground state to develop color. FIG. 5 is a graph of intensity with respect to the wavelengths when the recording is performed on the recording medium. In this graph, the horizontal axis represents the wavelength of light, and the vertical axis represents the intensity. This graph shows the intensity of light when the wavelength of light applied to a recording sample and the wavelength of light received from the recording sample are respectively changed for detection.

An excitation spectrum 401 represents the intensity of the received light when the wavelength of the received light is fixed and the wavelength of the light applied to the recording sample of the fluorescent pink ink is changed. An emission spectrum 402 represents, for each wavelength, the intensity of the light received from the recording sample, with respect to the light of the wavelength excited when light of 480 nm is irradiated to the recording sample of the fluorescent pink ink.

As can be seen from FIG. 5, a wavelength range in which the fluorescent color ink recorded on the paper surface is excited is situated on the shorter wavelength side while overlapping with the wavelength range in which light is emitted. Moreover, the excitation spectrum 401 has high intensity in some wave lengths and low intensity in other wavelengths, and has wavelengths in which light is emitted efficiently and wavelengths in which light is not emitted efficiently. Moreover, as for the emission spectrum 402, since the fluorescent coloring material emits light, a reflectance at the emission wavelength often exceeds "1". In the present embodiment, a coloring material having such characteristics as shown above is defined as the fluorescent coloring material. Although the emission spectrum 402 in FIG. 5 represents a result obtained when visible light of 480 nm is applied, as can be seen from the excitation spectrum 401, there is a high excitation intensity also at 380 nm, and normally, the fluorescent color ink is excited also by ultraviolet light (UV light) of 380 nm or less.

As described above, in the present embodiment, the fluorescent color ink includes not only the ink constituted by only the spot color ink of the fluorescent color but also the ink in which the fluorescent color ink and the process color ink are mixed, and the ink in which the spot color ink of the fluorescent color and the spot color ink of the non-fluorescent color are mixed. Similarly, in the present embodiment, a fluorescent spot color includes not only the color printed by only the spot color ink of the fluorescent color, but also the color printed by using both the fluorescent color ink and the process color ink, and the color printed by using both the spot color ink of the fluorescent color and the spot color ink of the non-fluorescent color. On the other hand, the process color is a color printed only by using the process color ink.

Although the excitation and emission of the fluorescent pink have been described above, fluorescent color inks emitting other wavelengths may be used in the present disclosure. For example, there are a fluorescent blue that emits light in a blue region (450 nm to 500 nm), and a fluorescent green that emits light in a green region (500 nm to 565 nm). Further, a fluorescent yellow that emits light in a yellow region (565 nm to 590 nm), a fluorescent orange or a fluorescent red that emits light in a red region (590 nm to 780 nm), or the like may be used. Further, a combination of the above fluorescent color inks may be used. Further, a color tone may be adjusted by combining the fluorescent color inks respectively having different intensities of excitation wavelengths. For example, it may be possible to use the fluorescent pink ink in which excitation in the blue region is weak and excitation in the green region is strong, and which emits light in an orange region.

In the present embodiment, the subtractive color mixture ink is defined as an ink containing a coloring material that absorbs light of a specific wavelength among applied light and does not emit light. For example, the subtractive color mixture ink has spectral reflectances such as cyan (C) 403, magenta (M) 404, and yellow (Y) 405 shown in FIG. 5. The graph in FIG. 5 represents results measured using a well-known method for measuring spectral reflectances. Unlike the fluorescent color ink, the subtractive color mixture ink only absorbs light, and therefore the reflectance does not exceed "1".

Next, mixing of the fluorescent color ink and the subtractive color mixture ink on the paper surface will be described with reference to FIG. 5. If the fluorescent pink and the yellow 405 are mixed, the yellow absorbs light in the wavelength range (around 480 nm) of the excitation spectrum 401 of the fluorescent pink. Therefore, light of the fluorescent pink in the wavelength range of the excitation spectrum 401 is absorbed by the yellow, and its sufficient excitation becomes impossible, thereby suppressing emission of light. If the fluorescent pink and the cyan 403 are mixed, the cyan absorbs light in the wavelength range (around 560 to 640 nm) of the emission spectrum 402 of the fluorescent pink. Therefore, the cyan ink absorbs the light emitted by the fluorescent pink, and the emitted light is suppressed. If the fluorescent pink and the magenta 404 are mixed, light at a portion where an excitation sensitivity of the fluorescent pink is high is absorbed, and light emitted is also absorbed. If the fluorescent pink and a black ink (not shown) are mixed, light in the wavelength range of the excitation spectrum 401 is absorbed, and light in the wavelength range of the emission spectrum 402 is also absorbed. Therefore, excitation of the fluorescent pink is also suppressed, and light emitted from the fluorescent pink is absorbed. That is, if the fluorescent pink and the subtractive color mixture ink are mixed, a contribution ratio of the fluorescent pink to the color development decreases. However, recent recording apparatuses use not only fluorescent color inks alone, but also reproduce colors using a combination of the subtractive color mixture inks and the fluorescent color inks from which color development effects are obtained.

In general, a medium (paper) used for printing is white, and its reflectance is substantially constant in visible regions and frequently exhibits high reflectance (not shown). Therefore, in the present embodiment, if assuming that the maximum spectral reflectance of a printed color is "a" and the spectral reflectance of a paper white at the same wavelength as that of "a" is "b", a color satisfying the relation "a>b" is defined as the fluorescent color.

<Fluorescent Color Ink>

Next, the fluorescent color ink used in the present embodiment will be described.

In the present embodiment, the fluorescent color ink prepared by mixing a dispersion of a coloring material having fluorescent characteristics, a solvent, and an active material is used. The dispersion of the fluorescent coloring material used in the present embodiment has the above-described fluorescent characteristics. For example, NKW-3207E (fluorescent pink water dispersion: product of Nippon Fluorescent Chemical Co., Ltd.) or NKW-3205E (fluorescent yellow water dispersion: product of Nippon Fluorescent Chemical Co., Ltd.) may be used as the coloring material having the fluorescent characteristics.

A known solvent and an activator are combined with the above fluorescent coloring material dispersion to disperse the fluorescent coloring material dispersion, thereby forming an ink. A dispersion method of the fluorescent coloring material dispersion is not particularly limited. For example, a fluorescent coloring material dispersion dispersed with a surfactant, a resin-dispersed fluorescent coloring material dispersion dispersed with a dispersing resin, or the like can be used. Needless to say, fluorescent coloring material dispersions made by different dispersion methods can also be combined and used as a dispersion element. As the surfactant, an anionic, nonionic, cationic, or amphoteric surfactant can be used. As the dispersing resin, any resin can be used as long as it is a water-soluble or water-dispersible resin, and among them, a resin having a weight average molecular weight of 1,000 to 100,000, more preferably 3,000 to 50,000 is preferable. As the solvent, for example, an aqueous medium containing water and a water-soluble organic solvent is preferably used.

<Recording Medium>

The recording medium of the present disclosure includes a base material and at least one ink receiving layer. In the present disclosure, an ink-jet recording medium used in an ink-jet image recording method is preferable.

<Light Emission Effect and Color Gamut Enlargement Effect of Printing Using Fluorescent Color Ink>

A light emission effect and a color gamut enlargement effect of printing using the fluorescent color ink will be described using the fluorescent pink ink described in FIG. 5 as an example.

Even if the fluorescent pink and other inks are combined instead of the fluorescent pink single color, light is not so suppressed depending on the combination of the inks, and a high-colored output can be obtained, thereby obtaining the light emission effect and the color gamut enlargement effect.

Figure 6A:
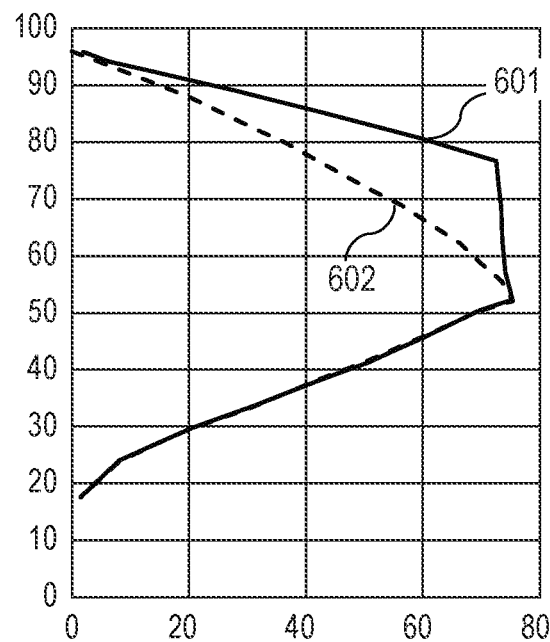
FIG. 6A is a cross-sectional view of a printer color gamut (hue angle 350°).
Figure 6B:
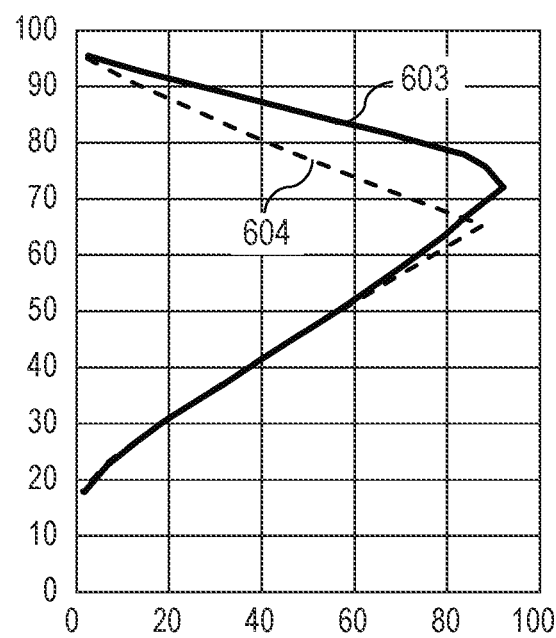
FIG. 6B is a cross-sectional view of the printer color gamut (hue angle 55°).
Figure 6C:
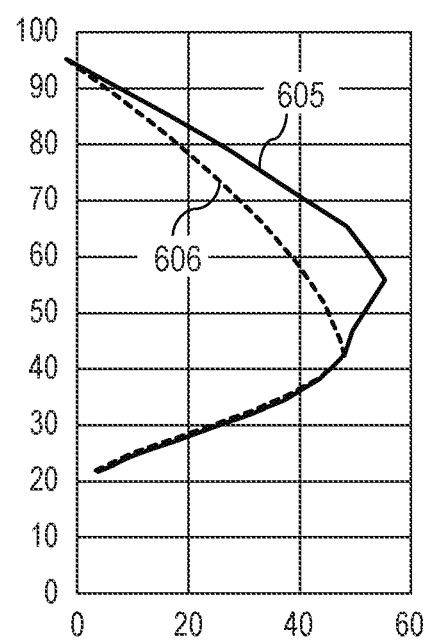
FIG. 6C is a cross-sectional view of the printer color gamut (hue angle 315°).

FIGS. 6A to 6C show the light emission effect and the color gamut enlargement effect using fluorescent pink ink. A color gamut is defined in a Lab space. FIG. 6A is a cross-sectional view of a printer color gamut having a hue angle of 350°. In this figure, the vertical axis represents lightness in the Lab space, and the horizontal axis represents saturation in the Lab space. The hue angle of 350° is substantially the same as the hue angle in the case of performing printing with the single color of the fluorescent pink ink. A solid line 601 indicates the color gamut if the fluorescent pink is used, and a broken line 602 indicates the color gamut if the fluorescent pink is not used. FIG. 6B is a cross-sectional view of an orange color gamut having a hue angle of 55°. In this figure, a solid line 603 indicates the color gamut if the fluorescent pink is used, and a broken line 604 indicates the color gamut if the fluorescent pink is not used. In the solid line 603, the color gamut can be widened by using a combination of the fluorescent pink and the yellow ink. FIG. 6C is a cross-sectional view of a violet gamut having a hue angle of 315°. In this figure, a solid line 605 indicates the color gamut if the fluorescent pink is used, and a broken line 606 indicates the color gamut if the fluorescent pink is not used. In the solid line 605, the color gamut can be widened by using a combination of the fluorescent pink and the cyan ink. If the subtractive color mixture inks of the C, M and Y inks and the fluorescent pink ink are used together, the combination with the Y ink has the smallest effect on suppressing light emission so that the light emission effect and the color gamut enlargement on the lightness side can be obtained in the orange color.

Although only the case of a single color of fluorescent pink is shown as the fluorescent color ink, if two fluorescent color inks of the fluorescent pink and the fluorescent yellow are used, the color gamut enlargement in FIG. 6B is broadened, thereby obtaining a fluorescent effect. Although this color gamut indicates a color gamut if visible light is applied, the light emission effect of the fluorescent color ink can be further obtained by applying light including ultraviolet light (UV light) as described above.

<Poster Using Fluorescent Color Ink and Fluorescent Spot Color>

Figure 7:
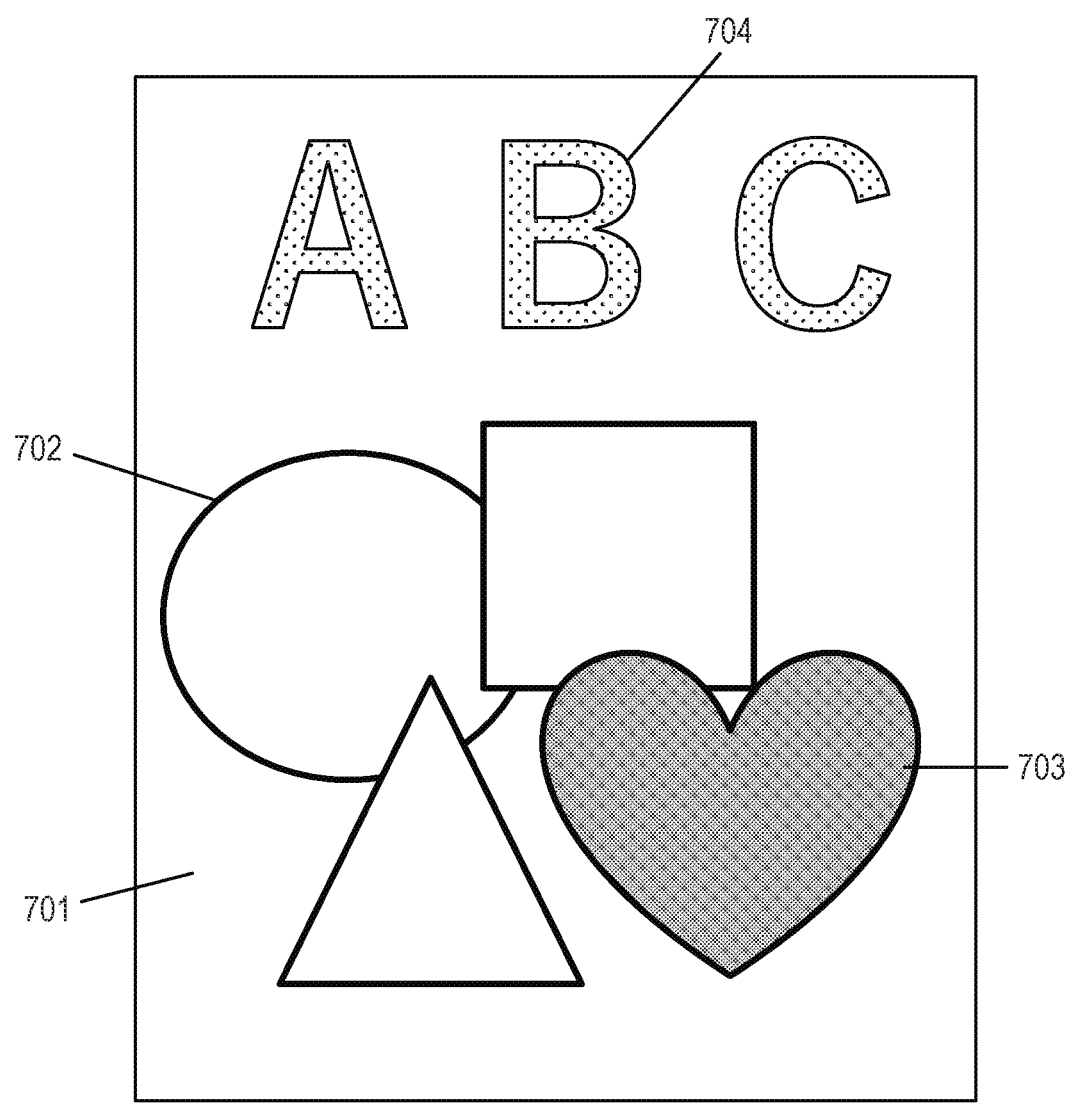
FIG. 7 shows an example of a poster using fluorescent spot colors.
Figure 8:
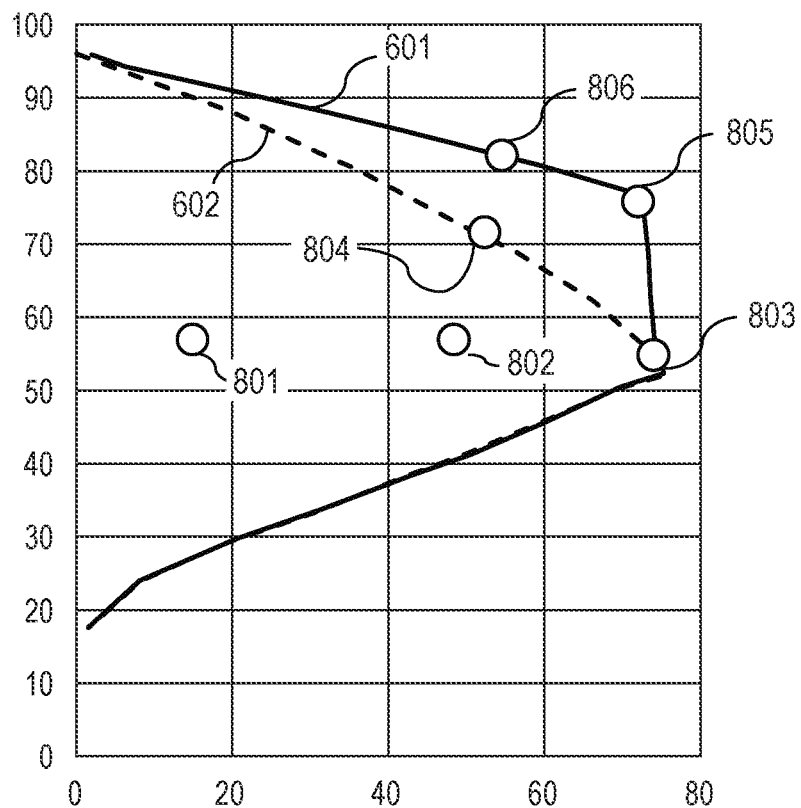
FIG. 8 is a cross-sectional view of the printer color gamut (hue angle 350°).

A poster using the fluorescent color ink will be described with reference to FIGS. 7 and 8. FIG. 7 shows an example of a poster image. The poster shown in FIG. 7 includes a background portion 701, figure portions 702 and 703, and a character portion 704.

Next, colors for recording the poster will be described with reference to FIG. 8. FIG. 8 is a cross-sectional view of the color gamut of the recording apparatus at the hue angle of 350°, in which the vertical axis represents lightness in the Lab space and the horizontal axis represents saturation in the Lab space. Colors 801, 802, 803 and 804 are colors included in the color gamut which can be recorded only by the subtractive color mixture without using the fluorescent pink, and colors 805 and 806 are colors in the color gamut which can be recorded only by using the fluorescent pink. It is assumed that the background portion 701 is printed in the color 801, and the figure portion 702 is printed in the color 802.

In printing using no fluorescent pink, the figure portion 703 is printed in the color 803 and the character portion 704 is printed in the color 804. This corresponds to normal printing. In case of a poster using the fluorescent pink, the figure portion 703 is printed in the color 805, and the character portion 704 is printed in the color 806. The color 805 and the color 806 are the colors that cannot be printed unless the fluorescent pink is used, and can make the poster brighter and more vivid due to the light emission effect of fluorescent color ink as compared with the color 801 and the color 802. Therefore, it is possible to create a poster in which the figure portion 703 and the character portion 704 draw viewer's attention at first sight. Further, a user may use the fluorescent color inks such as the colors 805 and 806 to select the bright and vivid colors from a plurality of candidates in a palette or the like, and replace the colors of the designated regions (the figure portion 703 and the characters portion 704 in this example) in the poster with the selected colors. The color obtained using such a function is referred to as a fluorescent spot color in the present embodiment. In the fluorescent spot color, as the light emission effect of the fluorescent color ink, irradiating ultraviolet light (UV light) in addition to normal illumination light allows to produce a more prominent poster due to the stronger light emission effect of the fluorescent color ink.

<Application>

Figure 9:
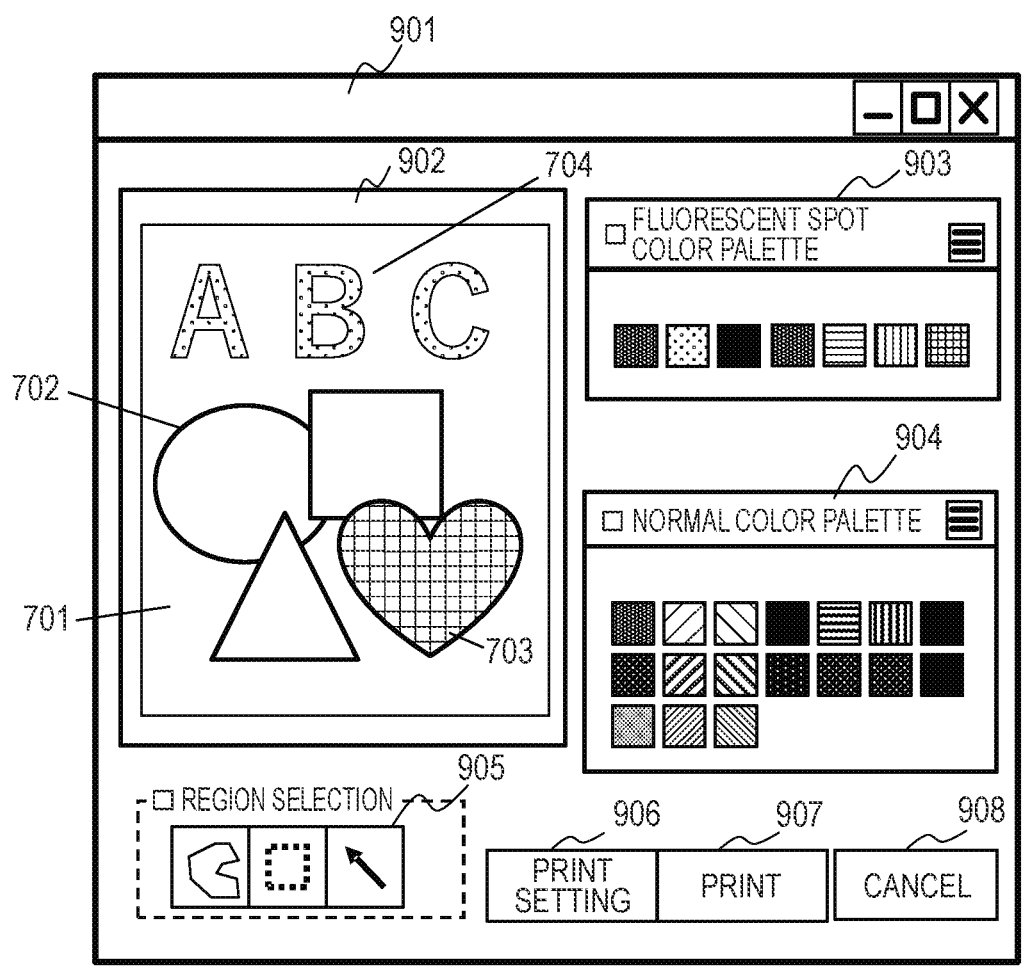
FIG. 9 shows a display screen of an application at a time of poster creation.

A method of creating a poster using the application 502 will be further described. A poster using the fluorescent spot color is created with the poster original drawing of FIG. 7. FIG. 9 shows a UI of the application 502 for creating a poster.

A display screen includes an overall display section 901, which is a screen of the whole of the application 502, and an image display section 902 that displays a poster image created by the application 502. It is assumed that the poster presented in FIG. 7 is displayed in the image display section 902. The overall display section 901 includes a fluorescent spot color palette box 903 for selecting a fluorescent spot color and a normal color palette box 904 for selecting a normal color. The fluorescent spot color palette box is prepared to use a plurality of colors as spot colors of RGB values, which can make the poster brighter and more vivid due to the light emission effect of the fluorescent color inks. The normal color palette box 904 is a color palette defined on an RGB basis, which is equivalent to that mounted in an OS standard paint application or other general applications. If a user designates an object in the poster image after selecting a color for replacement from the palette, the color of the object is replaced with the color selected from the palette. A selected region setting box 905 is provided for selectively displaying at least a part of an image region of the image data of the image display section 902. Further, a "PRINT SETTING" button 906 for switching to a setting screen for printing, a "PRINT" button 907 for executing printing, and a "CANCEL" button 908 for canceling a process are provided, and these buttons are used after completion of editing.

When the "PRINT SETTING" button 906 is pressed, a print dialog is started by the application 502. Generally, pressing a property button or the like from the print dialog provided in the application 502 allows to confirm or change settings of the selected recording apparatus 108.

<Print Setting Screen>

Figure 10:
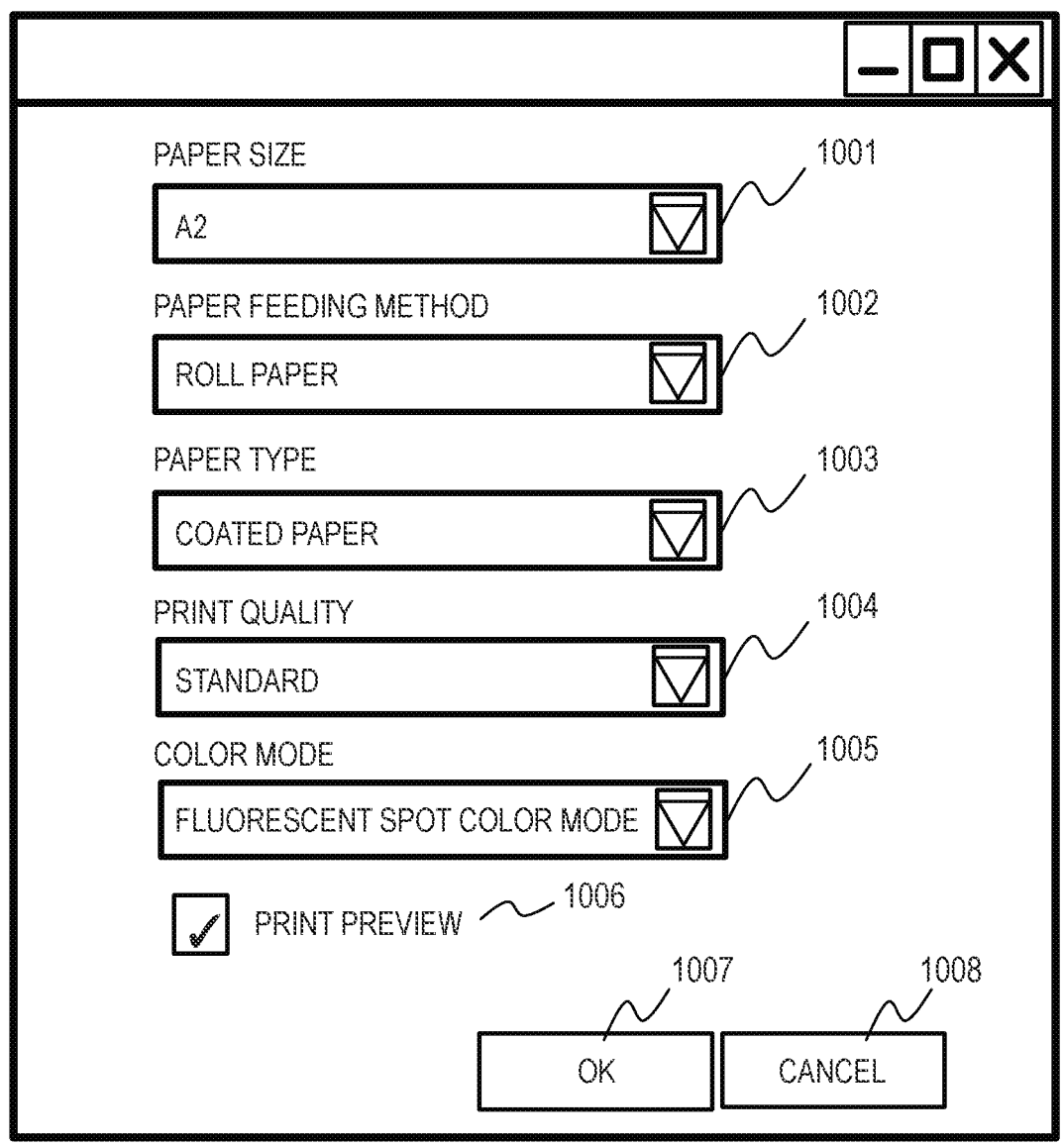
FIG. 10 shows a setting screen displayed by a printer driver.

FIG. 10 shows a user interface of a setting screen displayed by the printer driver 503. The user interface allows user to set a paper size in a paper size setting box 1001 in order to print the poster image edited by the application 502. Similarly, the user interface includes a paper feeding method setting box 1002 that allows to set a paper feeding method, a paper type setting box 1003 that allows to set a paper type, and a print quality setting box 1004 that allows to set a print quality. Further, the user interface includes a color mode setting box 1005 that allows to set either a mode for executing printing using a spot color or a mode for executing printing without using the spot color. In the present embodiment, the mode for executing the printing using the spot color is also referred to as a spot color mode. Specifically, in the mode for executing the printing using the spot color, pixels having the RGB values corresponding to the spot color are printed in the spot colors rather than the process colors. In the mode for executing the printing without using the spot color, the pixels having the RGB values corresponding to the spot color are printed in the process colors rather than the spot colors.

If a print preview checkbox 1006 for checking a finish before the printing is checked and an "OK" button 1007 is pressed, the print data is sent to the print preview control unit 506, and an activation process for a print preview is started. If the "OK" button 1007 is pressed without checking the print preview checkbox 1006, display of the user interface is ended. The print data is sent to the printer driver 503 by pressing the "PRINT" button 907 through the print dialog of the application 502. On the other hand, if a "CANCEL" button 1008 is pressed, the settings of the user interface become invalid, and the user interface screen for the setting displayed by the printer driver 503 is closed and the screen of the application 502 is displayed again.

The method of setting either the mode for executing the printing using the spot color or the mode for executing the printing without using the spot color is not limited to the present embodiment described above. For example, the printer driver 503 may be configured to display a region for receiving whether or not to set the spot color printing, and may display a checkbox corresponding to one spot color. In a mode in which printing using the plurality of spot colors can be executed, a plurality of checkboxes may be displayed. Then, the user can switch between the mode for executing the printing using the spot color corresponding to the operated checkbox and the mode for executing the printing without using the spot color corresponding to the operated checkbox based on the operation on the corresponding checkboxes. Specifically, for example, the printer driver 503 can display a checkbox corresponding to the fluorescent pink. The checkbox corresponding to the fluorescent pink corresponds to a region for receiving selection of whether or not to validate the spot color printing (fluorescent pink spot color printing) for printing the pixels having the RGB values corresponding to the fluorescent pink with the fluorescent pink.

Incidentally, if the fluorescent pink spot color printing is not validated, the pixels having the RGB values corresponding to the fluorescent pink are color printed in the process color that is not the fluorescent pink. Therefore, the relevant region can be said to be a region for receiving a setting regarding whether pixels having specific RGB values are printed with the fluorescent pink or colors different from the fluorescent pink. Further, for example, the relevant region can be said to be a region for receiving a setting regarding whether to execute the printing using the spot color ink or the normal ink without using the spot color ink.

If the fluorescent pink spot color printing is set, instruction information for instructing the recording apparatus 108 to execute the printing using the fluorescent pink is added to the print data generated by the printer driver 503. If the pixels included in the print data to which the instruction information has been added include pixels having the RGB values corresponding to the fluorescent pink, the recording apparatus 108 executes the printing using the spot color ink of the fluorescent pink on the basis of the relevant print data. If the fluorescent pink spot color printing is not set, the instruction information for instructing the recording apparatus 108 to execute the printing using the fluorescent pink is not added to the print data generated by the printer driver 503. Even if there are pixels having the RGB values corresponding to the fluorescent pink in pixels included in the print data to which the instruction information is not added, the spot color ink of the fluorescent pink is not used for the printing of the relevant pixels, and only the normal ink is used. Similarly to the checkboxes corresponding to the fluorescent pink, the checkboxes corresponding to other spot colors may be displayed, and validity or invalidity of the spot color printing may be set for each spot color.

<Print Preview>

Figure 11:
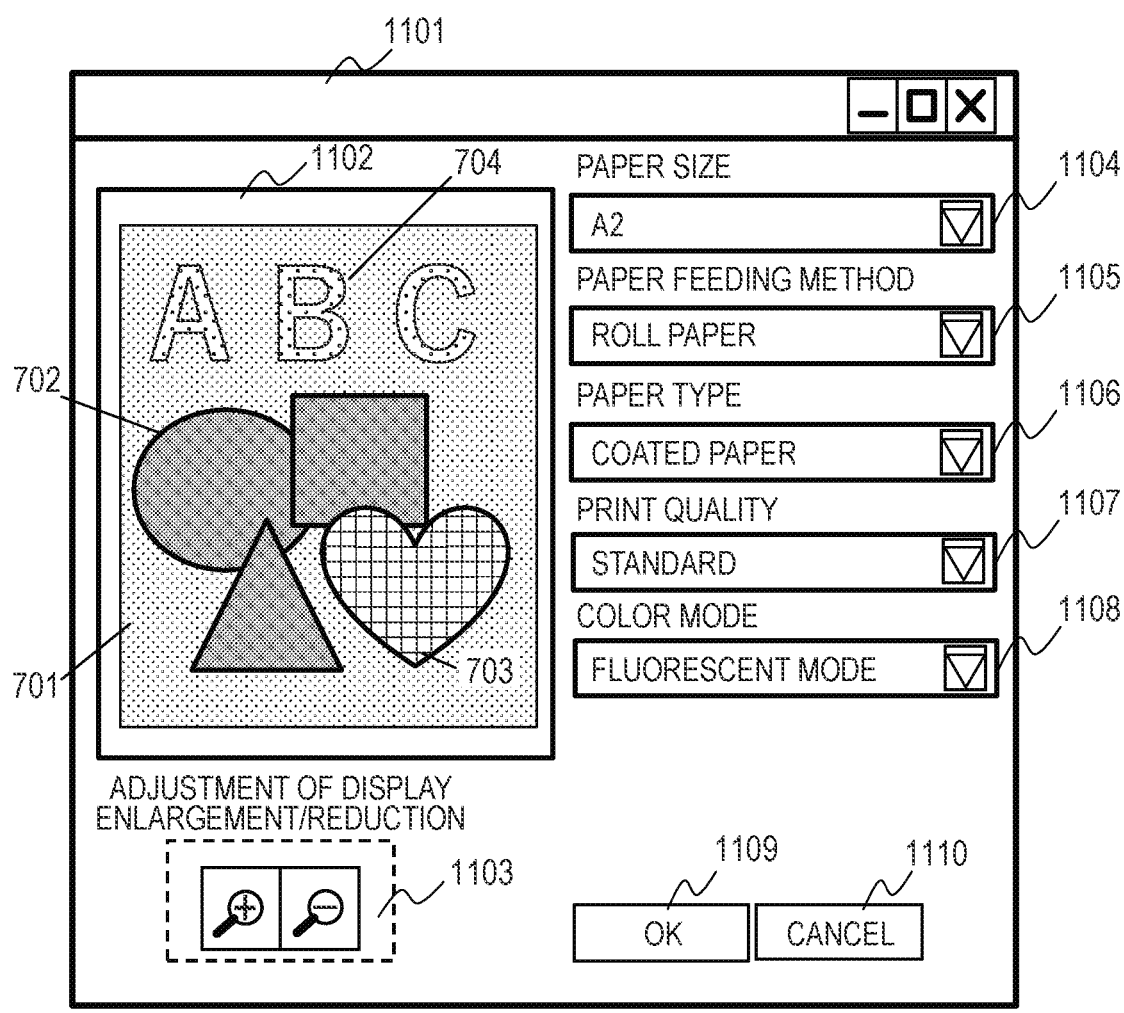
FIG. 11 shows a print preview screen.

FIG. 11 shows a user interface of a print preview displayed by the print preview control unit 506. A print preview dialog 1101 includes a print preview display section 1102, an enlargement/reduction display setting box 1103, a paper size setting box 1104, a paper feeding method setting box 1105, a paper type setting box 1106, and a print quality setting box 1107. Further, the print preview dialog 1101 includes a color mode setting box 1108, an "OK" button 1109, and a "CANCEL" button 1110. As for the paper size setting box 1104, the paper feeding method setting box 1105, the paper type setting box 1106, the print quality setting box 1107 and the color mode setting box 1108, the setting contents already acquired by the printer driver 503 are reflected as default values. The user confirms a preview image of the print image displayed on the print preview display section 1102, and presses the "OK" button 1109 to transfer the print data to the printer driver 503 if the user wants to perform the printing with the displayed contents. If the user confirms the preview image displayed on the print preview display section 1102 and does not perform the printing, the print preview dialog 1101 is closed by pressing the "CANCEL" button 1110. If the print preview control unit 506 transmits/receives information to/from the recording apparatus 108, the information is actually transmitted/received via the recording apparatus information acquisition unit 507.

<Display Process of Print Preview>

Figure 12:
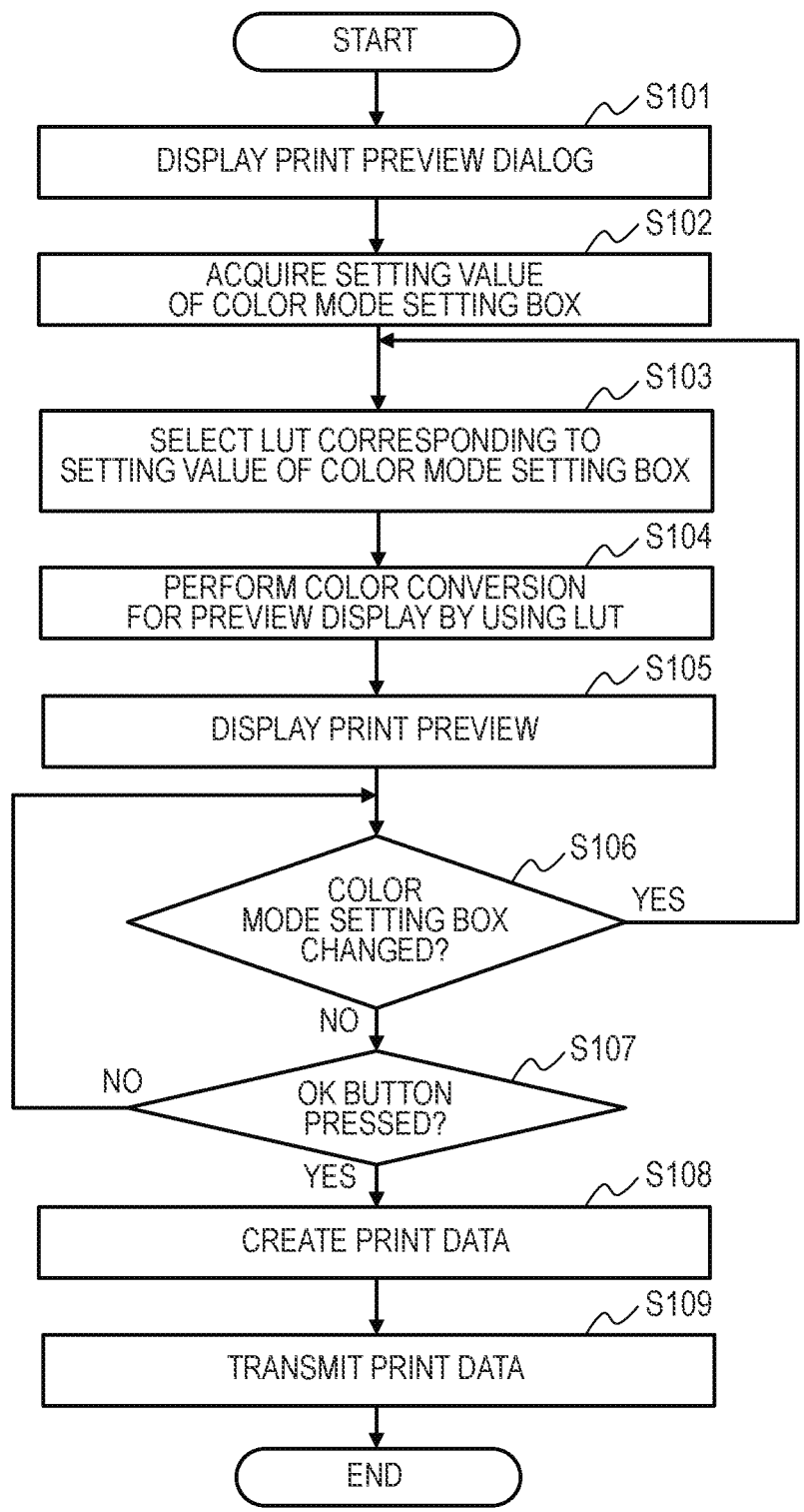
FIG. 12 is a flowchart of a process of displaying a print preview.

Next, a display process of the print preview in the image processing apparatus 101 will be described with reference to FIG. 12. In this process, the CPU 102 of the image processing apparatus 101 extracts the program stored in the HDD 104 into the RAM 103, and then executes the extracted program. It should be noted that the following steps of the display process are denoted by using "S".

In step S101, the CPU 102 displays the print preview dialog 1101.

In step S102, the CPU 102 acquires a setting value selected via the color mode setting box 1108 set in the print preview dialog 1101.

In step S103, the CPU 102 selects a LUT (Look-Up Table) for displaying print preview corresponding to the setting values set in the color mode setting box 1108 acquired from the recording apparatus 108. In the present embodiment, there are two types of LUTs, one for the fluorescence poster mode and the other for the fluorescence spot color mode, and either one of them is selected. In the present embodiment, it is assumed that the fluorescent poster mode and the fluorescent spot color mode are prepared as modes for a state in which the spot color printing is valid. Therefore, in step S103, it is assumed that the LUT is selected depending on which mode is set. The fluorescence poster mode is used for performing the printing by using the spot colors in all regions in which the spot colors can be used in an image subject to the printing. On the other hand, the fluorescent spot color mode is used for performing the printing by using the spot color only in a region in which the spot color that is set valid can be used for an image subject to the printing, and by not using the spot color in a region in which the spot color that is not set valid can be used. The user can voluntarily execute the setting of validity/invalidity of each spot color usable by the recording apparatus 108 via the printer driver 503. A method of creating the LUT for displaying a print preview will be described later.

In step S104, the CPU 102 performs color conversion of data of the poster image for displaying a preview by using the LUT for displaying a print preview selected in step S103. If a LUT for the fluorescent poster mode is selected in step S103, the lightness and the saturation are assigned in the color gamut of the monitor by a conventional mapping method such as a minimum color difference, a lightness retention and a saturation retention to display the preview, for regions in which the reflectance exceeds "1" in a wavelength range of light emission. However, the mapping method is not limited to the present embodiment described above. With respect to the region in which the reflectance is equal to or lower than "1", the color conversion of the poster image data is performed for displaying the preview by using a LUT for displaying the preview which is created to display a preview at lightness having a lightness compression ratio higher than that used in case of displaying a preview of a region in which the reflectance exceeds "1", which will be described later. If a LUT for the fluorescent spot color is selected in step S103, a preview for regions corresponding to the RGB signal values determined by the user to use the fluorescent ink is displayed with a lightness similar to that of the conventional technique. Then, with respect to the other regions, the color conversion of the poster image data is performed for displaying the preview by using a LUT for displaying the preview that is created to display a preview at lightness having a lightness compression ratio higher than that used in case of displaying a preview of the RGB signal values determined by the user to use the fluorescent ink.

As a result, if the LUT for the fluorescent poster mode is selected in step S103, the lightness compression ratio of the region in which the spot color is not used for the image subject to the printing is controlled to be higher than the lightness compression ratio of all the regions in which the spot color can be used for the image subject to the printing. If the LUT for the fluorescent spot color is selected in step S103, the lightness compression ratio of regions in which the spot color that is set valid for the image subject to the printing is not used is controlled to be higher than the lightness compression ratio of regions in which the spot color that is set valid for the image subject to the printing can be used. The regions of the image subject to the printing in which the spot color that is set valid is not used may include a region of the image subject to the printing in which the spot color that is set invalid can be used. In this way, depending on which of the fluorescence poster mode and the fluorescence spot color mode is set, the target region to be controlled so as to increase the lightness compression ratio differs.

In step S105, the CPU 102 executes control (second controlling) for displaying the conversion result obtained in step S104 on the print preview display section 1102 of the print preview dialog 1101.

In step S106, the CPU 102 decides whether the color mode setting box 1108 has been changed. If changed (YES in step S106), the process returns to step S103 to perform the process of displaying print preview data, as it is necessary to switch the display of the print preview data. If not changed (NO in step S106), the process advances to step S107. In step S107, the CPU 102 decides whether or not the "OK" button 1109 is pressed in the print preview dialog 1101. If the "OK" button 1109 is pressed, the process advances to step S108, and the printer driver 503 performs a rendering process in accordance with designated print conditions to create print data.

Then, in step S109, the print data is transmitted to the recording apparatus 108, whereby the print preview process of the present embodiment ends. If not pressed, the process returns to step S107 to perform the process of displaying a print preview.

In step S102, the CPU 102 may acquire setting information of the paper size setting box 1104, the paper feeding method setting box 1105, the paper type setting box 1106 and the print quality setting box 1107 in addition to setting information of the color mode setting box 1108. Adding these pieces of information and increasing types of LUTs selectable in step S103 allows to improve accuracy of the display of preview for the image to be printed.

In the present embodiment, the color mode setting box 1108 is just described for the mode in which the fluorescent color ink is used. However, items set via the color mode setting box 1108 are not limited to the present embodiment, and, for example, another mode in which the fluorescent color ink is not used may be set via the color mode setting box 1108. Accordingly, the LUT selected in step S103 may also include a mode in which the fluorescent color ink is not used, and there is no limitation on the number of LUTs. Although the LUT is used for the color conversion for displaying a preview in the present embodiment, the method for the color conversion is not limited to the usage of LUT. For example, the color conversion may be performed by calculation. Besides, the LUT may be calculated at any time by acquiring information for specifying a color reproduction region corresponding to the information of the paper type setting box 1106, the print quality setting box 1107 and the color mode setting box 1108 of the recording apparatus 108, and by acquiring information specifying colors of the fluorescent color inks.

<LUT for Displaying Print Preview>

Figure 13A:
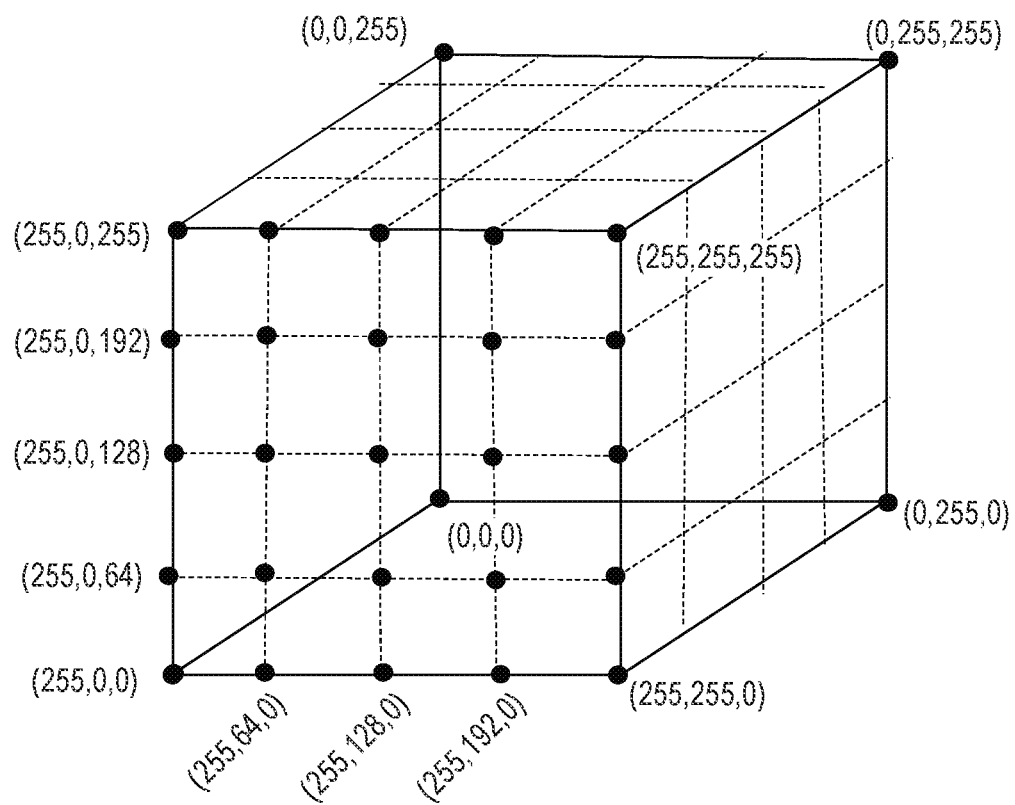
FIG. 13A is an explanatory diagram of a 5-Grid LUT.

The LUT for displaying print preview used in step S103 will be described in detail. Here, for the sake of simplicity, the description will be made using a 5-Grid LUT shown in FIG. 13A. This LUT converts RGB values of the input image data into device RGB values of the monitor. RGB values of the input image data generally include sRGB, AdobeRGB, and the like, but the color space is not limited thereto. For example, as shown in FIG. 13B, there is correspondence assigned between RGB of the monitor and the RGB values corresponding to lattice points.

<LUT Creation Method for Fluorescent Color Display>

The following describes how to create the LUT. First, a patch chart is printed using the recording apparatus 108 under printing conditions of the fluorescent poster or fluorescent spot color using the fluorescent color ink. The patch chart is composed of 16×16×16=4096 color patches corresponding to the number of lattice points of the LUT for displaying preview to be created. The number of patches is not limited to the number of lattice points of LUT, but may be $M^3$ (M is an integer). Next, the spectral reflectance of the printed patch chart is measured. The color measurement may be performed using a light source of only visible light, a light source of only ultraviolet light, or a light source obtained by combining visible light and ultraviolet light. Since the fluorescent pink described in the present embodiment absorbs both visible light and ultraviolet light, a light source having both visible light and ultraviolet light shall be used. Next, the spectral reflectance of a region of a medium is measured. The measured region (hereinafter referred to as a "paper white") includes no printed portion and the medium used for the measurement is the same as the medium used for printing the patch chart. Then, the spectral reflectance obtained by measuring color of each patch corresponding to each color ink is compared with the spectral reflectance of the paper white. Then, it is decided, at the wavelength having the highest reflectance in the spectral reflectance of each patch, whether the spectral reflectance of each patch is higher or lower than the spectral reflectance of the paper white. It is decided that the fluorescent color is used if the spectral reflectance of each patch is higher than the spectral reflectance of the paper white, and it is decided that the non-fluorescent color is used if the spectral reflectance of each patch is equal to or lower than the spectral reflectance of the paper white.

Figure 14:
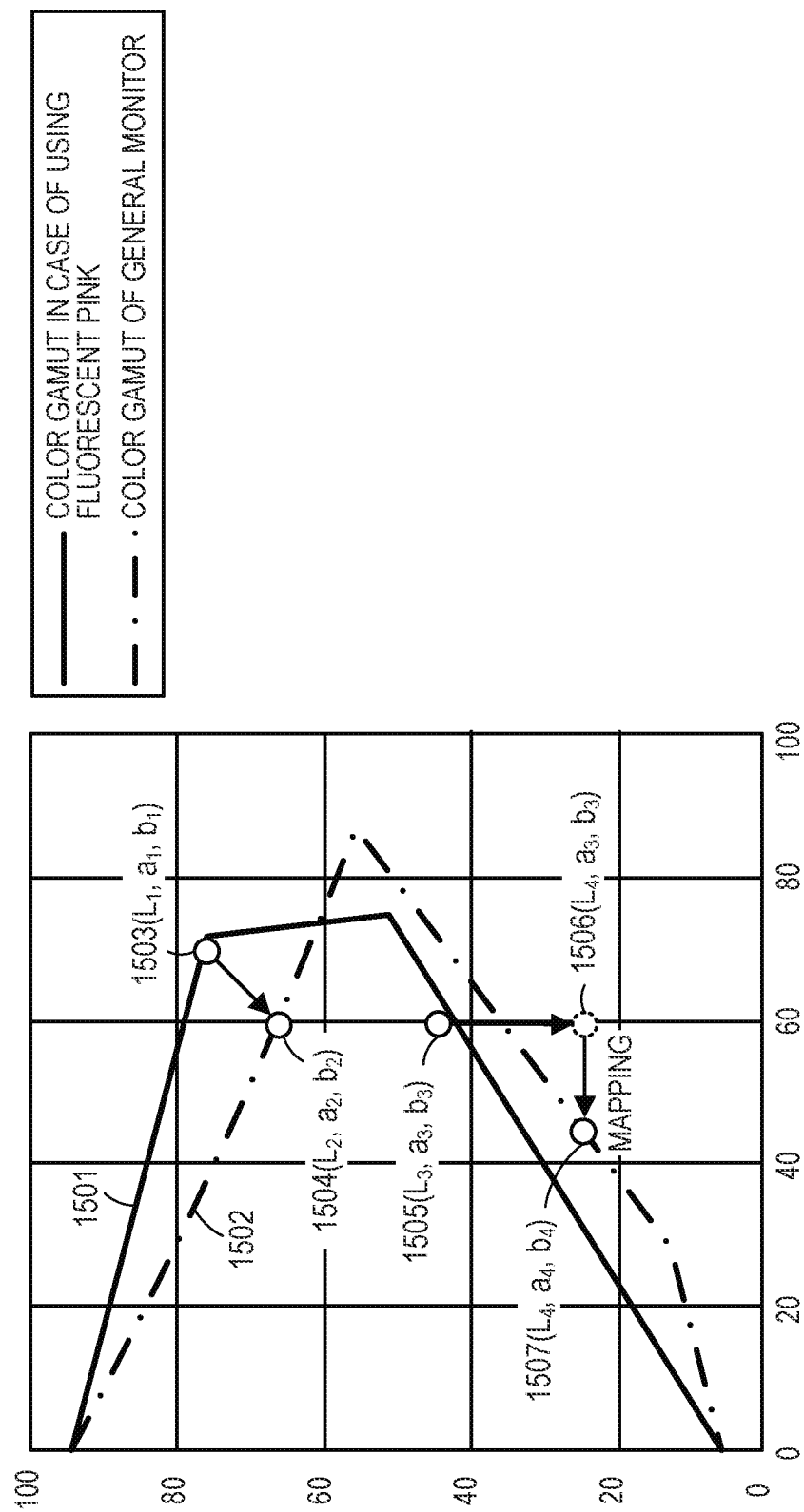
FIG. 14 is a cross-sectional view of the printer color gamut (hue angle 350°: color conversion of fluorescent colors and non-fluorescent colors).

The subsequent process will be described with reference to FIG. 14. FIG. 14 is a cross-sectional view of the printer color gamut at the hue angle of 350°. The vertical axis represents lightness in the Lab space, and the horizontal axis represents saturation in the Lab space. A solid line 1501 represents the color gamut if the fluorescent pink is used. A dot-and-dash line 1502 represents a display color gamut of a general monitor, and the range is substantially the same as the color gamut of sRGB. Information of a colorimetric value 1503 ($L_1$, $a_1$, $b_1$) corresponding to patch signal values R, G, and B of the color decided as the fluorescent color is acquired. This colorimetric value may be acquired using a light source the same as the light source used for measuring the spectral reflectance. However, the colorimetric value may be acquired using a light source providing only visible light or only ultraviolet light depending on applications.

The colorimetric value 1503 ($L_1$, $a_1$, $b_1$) of the fluorescent color is decided as to whether this value is within or outside the display color gamut of the monitor. If this value is outside the color gamut, the lightness L, the chromaticity a and the chromaticity b are color converted (mapped) to be within the display color gamut of the monitor. Any known mapping method may be used for the color conversion. Assuming that the colorimetric value after the mapping is a value 1504 ($L_2$, $a_2$, $b_2$), a compression ratio $L_{comp}$ is calculated based on the colorimetric value $L_1$ of the original fluorescent color and the colorimetric value $L_2$ after the mapping using the following equation (1).

$$L_{comp}=L_2/L_1 \tag{1}$$

Then, the compression ratio $L_{comp}$ is obtained for all the fluorescent colors, and $L_{comp\ max}$, which is the maximum compression ratio among the obtained compression ratios $L_{comp}$, is obtained.

Next, with respect to a colorimetric value 1505 ($L_3$, $a_3$, $b_3$) decided to be a non-fluorescent color, a compression ratio $L_{comp\ max}+\alpha$ (where $0 \le \alpha$) that is equal to or greater than $L_{comp\ max}$ (i.e., equal to or greater than the maximum compression ratio) is multiplied with the lightness $L_3$ to obtain a value $L_4$ that is lightness after the compression of the non-fluorescent color.

$$L_4=L_3\times(L_{comp\ max}+\alpha) \tag{2}$$

Due to the lightness being compressed to $L_4$, there are cases in which the colorimetric value 1505 ($L_3$, $a_3$, $b_3$) being the non-fluorescent color is out of the range of the dot-and-dash line 1502 indicating the display color gamut of the monitor, like an intermediate point 1506 ($L_4$, $a_3$, $b_3$). In this case, the mapping is performed so that the data such as the point 1506 being outside the color gamut is within the color gamut after the mapping, such as a point 1507 ($L_4$, $a_4$, $b_4$) being the non-fluorescent color. As a result, the LUT is created to make the fluorescent colors brighter and other non-fluorescent colors darker when displayed.

In the present embodiment, the compression ratio equal to or higher than $L_{comp\ max}$ is expressed as "$L_{comp\ max}+\alpha$", in which an adjustment value is expressed as $\alpha$ as shown in the equation (2). The adjustment value a may be varied to automatically or user-manually change the compression ratio, or this value a may be varied to automatically change the compression ratio according to ambient light around the user viewing the monitor. The above adjustment allows to provide users with better quality and visibility of the print preview displayed for the users. Further, since the fluorescent color ink shows a bright and vivid color, this ink is generally brighter than the lightness of the maximum saturation of each hue of the device color gamut that the recording apparatus 108 has. Therefore, it is possible to set the lightness to be equal to or lower than the lowest lightness in the lightness of the maximum saturation of the hue for which the fluorescent color ink is used. Further, the value a may be set to be equal to or smaller than the average value of the lightness of white and the lightness of black of the monitor. Further, the value a may be set such that the luminance becomes 10 lux or less for displaying the print preview. The luminance of 10 lux or less corresponds to the luminance with which the fluorescent color ink may be checked by applying black light in a dark place.

The above configuration allows users to easily check the effect of using the fluorescent color ink in the poster image without requiring manual adjustment. Further, in the present embodiment, the compression ratio is uniformly applied to the lightness of the non-fluorescent color. However, the compression ratio of $L_{comp\ max}+\alpha$ may be applied to the signal value having the highest lightness, and the compression ratio may be gradually reduced toward black. Using the above method allows to prevent the dark portion of the non-fluorescent color from clipping into black, which allows users to further check the finish of the non-fluorescent color region. If all the non-fluorescent colors become black, the user would be able to know where the fluorescent color is used, but unable to check or see the finish at the time of the printing. Therefore, it is preferable to set a so as not to make white or the color having the highest lightness among the non-fluorescent colors be black.

Further, in the present embodiment, the compression is applied to the lightness, but it is also possible to convert the color space into the YCC (YCbCr) model, and apply the compression to brightness Y, by using an equation (3) of CIELAB.

$$L^* = 116(Y/Yn)^{1/3} - 16 \quad (3)$$

Y: brightness, Yn: brightness value of reference white

In that case, brightness Yg in lower saturation which appears to be the same luminance in achromatic color may be calculated from the fluorescent color having the lowest brightness using the prediction equation of the Helmholtz-Kohlruasch effect, and the compression ratio may be set to be equal to or lower than the relevant brightness. Using this method allows to check the effect of the fluorescent color, and also to widely use the range of the color gamut of the monitor for color reproduction of the non-fluorescent color, which is useful for users. Incidentally, note that the above predictive equation is referred to in "Relationship between the Two Kinds of Representation Methods in the Helmholtz-Kohlruasch Effect", Yoshinobu Nayatani (1998), Journal of the Illuminating Engineering Institute of Japan, Vol. 82, No. 2, 1998, pp. 143-152.

As described above, according to the present embodiment, based on the fact that the mode for executing the printing using the spot color is set (the spot color printing is set valid), predetermined control (first controlling) is executed for making the lightness compression ratio of the region not corresponding to the spot color higher than the lightness compression ratio of the region corresponding to the spot color in the image. More specifically, predetermined control is executed to make the lightness compression ratio of the region (first image region) not corresponding to the fluorescent spot color higher than the lightness compression ratio of the region (second image region) corresponding to the fluorescent spot color among the plurality of spot colors. More specifically, if the highest reflectance in the spectral reflectance obtained by measuring color of ink corresponding to the predetermined fluorescent spot color is higher than the reflectance of the paper white, predetermined control is executed on the relevant predetermined fluorescent spot color.

There may be a plurality of predetermined fluorescent spot colors corresponding to the reflectance higher than the reflectance of the paper white. In this case, a predetermined control is executed to make the lightness compression ratio of the region not corresponding to the plurality of fluorescent spot colors higher than the lightness compression ratio of the region corresponding to the plurality of fluorescent spot colors. In other words, even for the fluorescent spot color, if the highest reflectance in the spectral reflectance obtained by measuring the color of the ink corresponding to the fluorescent spot color is lower than the reflectance of the paper white, the lightness compression ratio of the region not corresponding to the fluorescent spot color is controlled in the same manner as the lightness compression ratio of the region not corresponding to the spot colors. Thus, the present embodiment allows to show users in recognizable manners a print preview including bright and vivid colors realized by using the fluorescent color ink.

Second Embodiment

In the first embodiment, the spectral reflectance of each patch is compared with the spectral reflectance of the paper white. If the spectral reflectance of each patch is higher than the spectral reflectance of the paper white at the wavelength having the highest reflectance in the spectral reflectance of the respective color-measured patches, the color is decided as the fluorescent color, and the lightness is compressed. In the second embodiment, a color is decided as the fluorescent color if the spectral reflectance of each patch is 1.2 times or more higher than the spectral reflectance of the paper white, and the n the lightness compression is performed.

The reason for requiring the spectral reflectance to be at least 1.2 times greater than the spectral reflectance of paper white is as follows. In the equation (3) shown above, Y/Yn is replaced with the ratio of the spectral reflectance of the fluorescent color and the spectral reflectance of the paper white. Then, a color difference ($\Delta E^*ab$) is calculated by $\Delta E^*ab = \{(\Delta L^*)^2 + (\Delta a^*)^2 + (\Delta b^*)^2\}^{1/2}$ using the CIE 1976 color difference calculation equation. As a result of the calculation, the color difference is 7.0 or more. This result of the calculation, i.e., the color difference of 7.0 indicates that it is difficult to recognize these colors as the same color on the same printed matter, according to the New Handbook of Color Science (third edition) (1998). In other words, and the above color difference is clearly recognizable as the effect of the fluorescent color.

According to the present embodiment, the more fluorescent color ink is used, which allows to display a print preview for users through the selection effective to exhibit bright and vivid colors.

Third Embodiment

Figure 15:
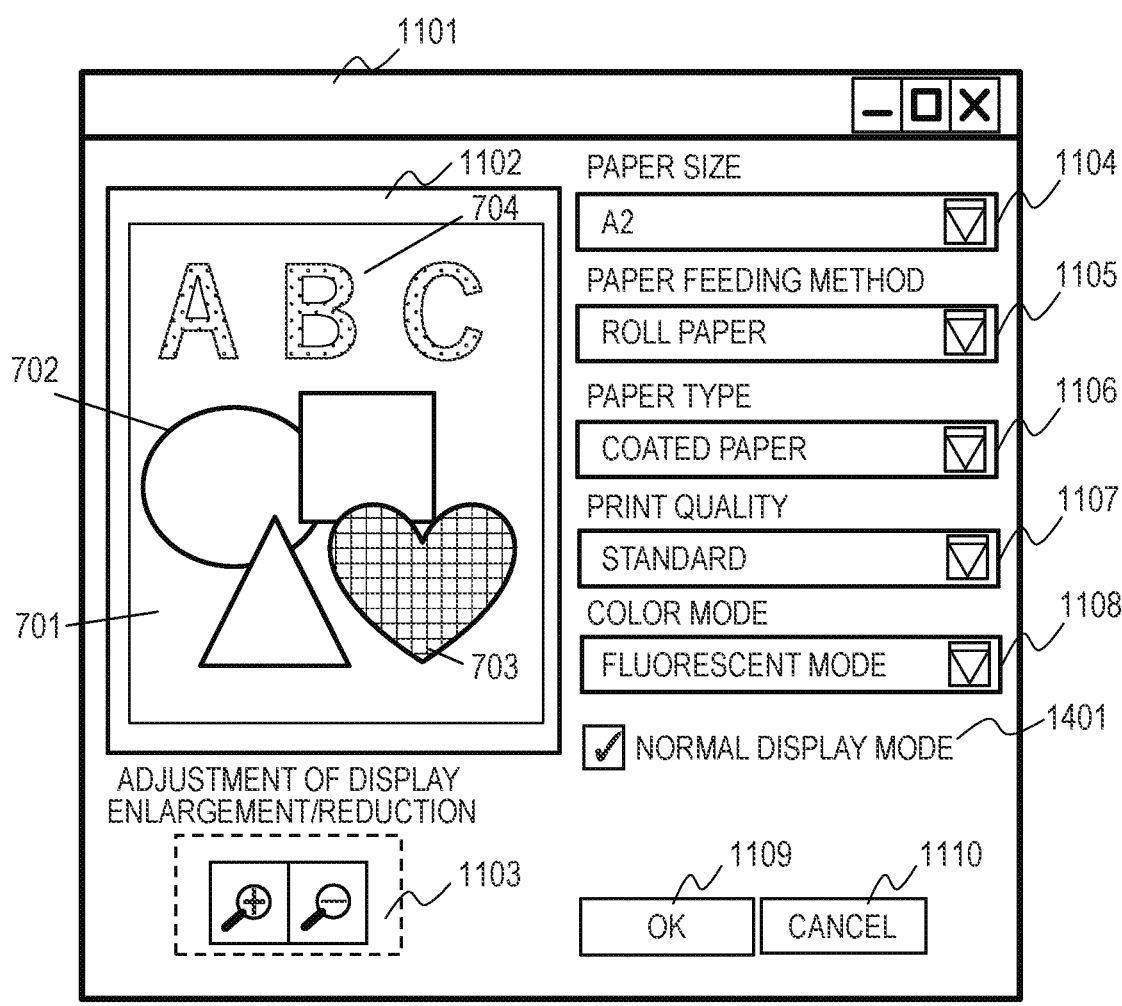
FIG. 15 shows the print preview screen (normal display mode).

In the first embodiment, the displayed preview proposes only the fluorescence poster mode and the fluorescence spot color mode. In the present embodiment, the preview includes a setting box 1401 for switching to a normal display mode as shown in FIG. 15. The displayed preview can be switched between a conventional normal preview and a preview using the LUT for displaying the fluorescent color by checking the setting box 1401.

FIG. 15 shows a print preview dialog 1101 according to the present embodiment. In the print preview dialog 1101, the setting box 1401 is newly provided. Checking or not checking the box 1401 allows to switch between the conventional normal preview and the preview using the LUT for displaying the fluorescent color. According to the present embodiment, it is possible to switch between the preview in which the lightness of the fluorescent colors is represented and the preview in which the non-fluorescent colors are properly represented, which allows to provide the actual print image for users in a recognizable manner.

As described above, however, in the conventional normal preview, it is difficult to distinguish the fluorescent colors located outside the device color gamut of the monitor from the non-fluorescent colors located around signal values after the mapping, as the fluorescent color located outside the device color gamut of the monitor is mapped to the vicinity of the color gamut boundaries. Thus, the user needs to be trained to be able to grasp the relationship between the two types of previews and the actual print image.

In the above description, displaying the previews is performed on the side of the image processing apparatus that is the host PC. However, the previews may be displayed on the side of recording apparatus 108 if the recording apparatus 108 includes a screen that is operable to display the preview image.

In the above description, based on the fact that the mode for executing the printing using the spot color is set (the spot color printing is set valid), the predetermined control is executed for making the lightness compression ratio of the region not corresponding to the spot color higher than the lightness compression ratio of the region corresponding to the spot color in the image. However, for example, in the case where the printer driver 503 is operable to use a plurality of spot colors and the validity and the invalidity of the spot color printing can be set for each of the plurality of the spot colors, different embodiments may be employed. For example, the predetermined control may be executed based on a setting of a mode for executing the printing using the fluorescent spot color among the plurality of spot colors. That is, for example, if the mode for executing the printing using the fluorescent spot color among the plurality of spot colors is not set but a mode for executing the printing using the spot color that is not fluorescent among the plurality of spot colors is set, the predetermined control may not be performed. Besides, in the predetermined control executed at this time, the control may be executed so that the lightness compression ratio of the region corresponding to the spot color that is not fluorescent is higher than the lightness compression ratio of the region corresponding to the spot color that is fluorescent.

According to the present disclosure, the user can grasp an image caused by the color development of the fluorescent color ink before the printing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-160592 filed Oct. 4, 2022, which is hereby incorporated by reference herein in its entirety.

What is claimed is:

1. A non-transitory computer readable storage medium that stores a program, wherein the program causes a computer of an image processing apparatus to execute:
   first controlling for making, in the program, a first lightness compression ratio of a first image region higher than a second lightness compression ratio of a second image region in a case where a setting for printing an image using a spot color, that is different from process colors, is set, the first image region not corresponding to the spot color in the image, and the second image region corresponding to the spot color in the image; and
   second controlling for displaying the image after the first controlling is executed.

2. The non-transitory computer readable storage medium according to claim 1, wherein, in the program, the image is displayed without the first controlling being executed, in a case where a setting for printing the image without using the spot color is set.

3. The non-transitory computer readable storage medium according to claim 1, wherein the first controlling performs control for making a lightness compression ratio of a region not corresponding to a fluorescent spot color among a plurality of spot colors in the image higher than a lightness compression ratio of a region corresponding to the fluorescent spot color.

4. The non-transitory computer readable storage medium according to claim 1, wherein
   the first controlling performs control for making a lightness compression ratio of a region not corresponding to a predetermined fluorescent spot color in the image higher than a lightness compression ratio of a region corresponding to one or a plurality of predetermined fluorescent spot colors among a plurality of fluorescent spot colors, and
   a highest reflectance in a spectral reflectance obtained by color measuring an ink corresponding to the predetermined fluorescent spot color is higher than a reflectance of a paper white.

5. The non-transitory computer readable storage medium according to claim 4, wherein
   the first controlling performs control for making a lightness compression ratio of a region not corresponding to a specific fluorescent spot color among the plurality of fluorescent spot colors in the image higher than the lightness compression ratio of the region corresponding to one or the plurality of predetermined fluorescent spot colors among the plurality of fluorescent spot colors, and
   a highest reflectance in a spectral reflectance obtained by color measuring an ink corresponding to the specific fluorescent spot color is lower than the reflectance of the paper white.

6. The non-transitory computer readable storage medium according to claim 1, wherein, in the first controlling, the first lightness compression ratio of the first image region not corresponding to the spot color is controlled to be equal to or higher than a maximum value of the second lightness compression ratio of the second image region corresponding to the spot color.

7. The non-transitory computer readable storage medium according to claim 1, wherein, in the first controlling, lightness of the first image region not corresponding to the spot color is compressed to be equal to or lower than an average value of lightness of white and lightness of black of a display used for displaying the image.

8. The non-transitory computer readable storage medium according to claim 1, wherein
in a state that a setting for performing printing using the spot color in all regions in which the spot color can be used in the image is performed in the program, the first controlling performs control for making a lightness compression ratio of a region other than all the regions corresponding to the spot color in the image higher than lightness compression ratios of all the regions corresponding to the spot color, and
in a state that a setting for performing printing using the spot color only in a region in which the spot color is valid can be used in the image and for performing printing without using the spot color in a region in which the spot color not set valid can be used is performed in the program, the first controlling performs control for making a lightness compression ratio of a region other than a region corresponding to the spot color set valid in the image higher than a lightness compression ratio of the region corresponding to the spot color set valid.

9. The non-transitory computer readable storage medium according to claim 1, wherein the spot color is a color that is printed by using at least one of a fluorescent pink ink, a fluorescent orange ink, a violet ink, a green ink, an orange ink, a gold ink and a silver ink.

10. An image processing apparatus storing a program and comprising at least one memory and at least one processor which functions as:
an execution unit configured to execute, in the program, first controlling that performs control for making a first lightness compression ratio of a first image region higher than a second lightness compression ratio of a second image region based on a fact that a setting for printing an image using a spot color that is different from process colors is performed, the first image region not corresponding to the spot color in the image, and the second image region corresponding to the spot color in the image; and
a display unit configured to execute second controlling for displaying the image after the first controlling is executed.

11. A method of controlling an image processing apparatus that stores a program, the method comprising:
executing, in the program, first controlling that performs control for making a first lightness compression ratio of a first image region higher than a second lightness compression ratio of a second image region based on a fact that a setting for printing an image using a spot color that is different from process colors is performed, the first image region not corresponding the spot color in the image, and the second image region corresponding to the spot color in the image; and
executing second controlling for displaying the image after the first controlling is executed.

12. The method of controlling the image processing apparatus according to claim 11, wherein, in the program, the image is displayed without the first controlling being executed, in a case where a setting for printing the image without using the spot color is set.

13. The method of controlling the image processing apparatus according to claim 11, wherein the first controlling performs control for making a lightness compression ratio of a region not corresponding to a fluorescent spot color among a plurality of spot colors in the image higher than a lightness compression ratio of a region corresponding to the fluorescent spot color.

14. The method of controlling the image processing apparatus according to claim 11, wherein
the first controlling performs control for making a lightness compression ratio of a region not corresponding to a predetermined fluorescent spot color in the image higher than a lightness compression ratio of a region corresponding to one or a plurality of predetermined fluorescent spot colors among a plurality of fluorescent spot colors, and
a highest reflectance in a spectral reflectance obtained by color measuring an ink corresponding to the predetermined fluorescent spot color is higher than a reflectance of a paper white.

15. The method of controlling the image processing apparatus according to claim 14, wherein
the first controlling performs control for making a lightness compression ratio of a region not corresponding to a specific fluorescent spot color among the plurality of fluorescent spot colors in the image higher than the lightness compression ratio of the region corresponding to one or the plurality of predetermined fluorescent spot colors among the plurality of fluorescent spot colors, and
a highest reflectance in a spectral reflectance obtained by color measuring an ink corresponding to the specific fluorescent spot color is lower than the reflectance of the paper white.

16. The method of controlling the image processing apparatus according to claim 11, wherein, in the first controlling, the first lightness compression ratio of the first image region not corresponding to the spot color is controlled to be equal to or higher than a maximum value of the second lightness compression ratio of the second image region corresponding to the spot color.

17. The method of controlling the image processing apparatus according to claim 11, wherein, in the first controlling, lightness of the first image region not corresponding to the spot color is compressed to be equal to or lower than an average value of lightness of white and lightness of black of a display used for displaying the image.

18. The method of controlling the image processing apparatus according to claim 11, wherein
in a state that a setting for performing printing using the spot color in all regions in which the spot color can be used in the image is performed in the program, the first controlling performs control for making a lightness compression ratio of a region other than all the regions corresponding to the spot color in the image higher than lightness compression ratios of all the regions corresponding to the spot color, and
in a state that a setting for performing printing using the spot color only in a region in which the spot color is valid can be used in the image and for performing printing without using the spot color in a region in which the spot color not set valid can be used is performed in the program, the first controlling performs control for making a lightness compression ratio of a region other than a region corresponding to the spot color set valid in the image higher than a lightness compression ratio of the region corresponding to the spot color set valid.

19. The method of controlling the image processing apparatus according to claim 11, wherein the spot color is a color that is printed by using at least one of a fluorescent pink ink, a fluorescent orange ink, a violet ink, a green ink, an orange ink, a gold ink and a silver ink.

\* \* \* \* \*